United States Patent [19]

Kiefer

[11] 4,245,309

[45] Jan. 13, 1981

[54] MICROPROCESSOR BASED CONTROL CIRCUIT FOR WASHING APPLIANCES WITH DIAGNOSTIC SYSTEM

[75] Inventor: George E. Kiefer, Louisville, Ky.

[73] Assignee: General Electric Company, Louisville, Ky.

[21] Appl. No.: 970,695

[22] Filed: Dec. 18, 1978

[51] Int. Cl.³ .................. G05B 19/04; G06F 11/22; G06F 15/46

[52] U.S. Cl. .................. 364/400; 68/12 R; 134/57 D; 340/309.4; 371/29; 364/104

[58] Field of Search ............ 364/400, 107, 120, 104, 364/505, 506, 507; 235/304, 304.1; 134/57 R, 57 D, 58 R, 58 D; 68/12 R; 307/141, 141.4, 141.8, 41; 340/309.4; 371/15, 20, 29

[56] References Cited

U.S. PATENT DOCUMENTS

| | | | |
|---|---|---|---|
| 3,939,453 | 2/1976 | Schroeder | 235/304 X |
| 3,986,372 | 10/1976 | Karklys | 68/12 R |
| 4,068,179 | 1/1978 | Sample et al. | 134/57 D X |
| 4,084,237 | 4/1978 | Beachem et al. | 364/400 |
| 4,158,432 | 6/1979 | Van Bavel | 235/304.1 |

*Primary Examiner*—Joseph F. Ruggiero
*Attorney, Agent, or Firm*—H. Neil Houser; Radford M. Reams

[57] ABSTRACT

A control circuit is disclosed for appliances such as dishwashers and clothes washers. The control circuit employs a microprocessor programmed to respond to user selected options to determine the operating sequence of the appliance. Feedback systems permit the detection and indication of fault conditions, such as overfill or drain blockage, and initiate protective responses from the microprocessor to prevent flooding or damage to the appliance. The circuit includes a diagnostic system having a diagnostic routine which will sequence through the usual operating cycles in response to operator input and which may be advanced through the cycles at the operator's discretion. The operative cycles and applicance malfunctions, if any, are displayed on a control panel as the diagnostic routine is executed thereby facilitating diagnosis and repair.

8 Claims, 27 Drawing Figures

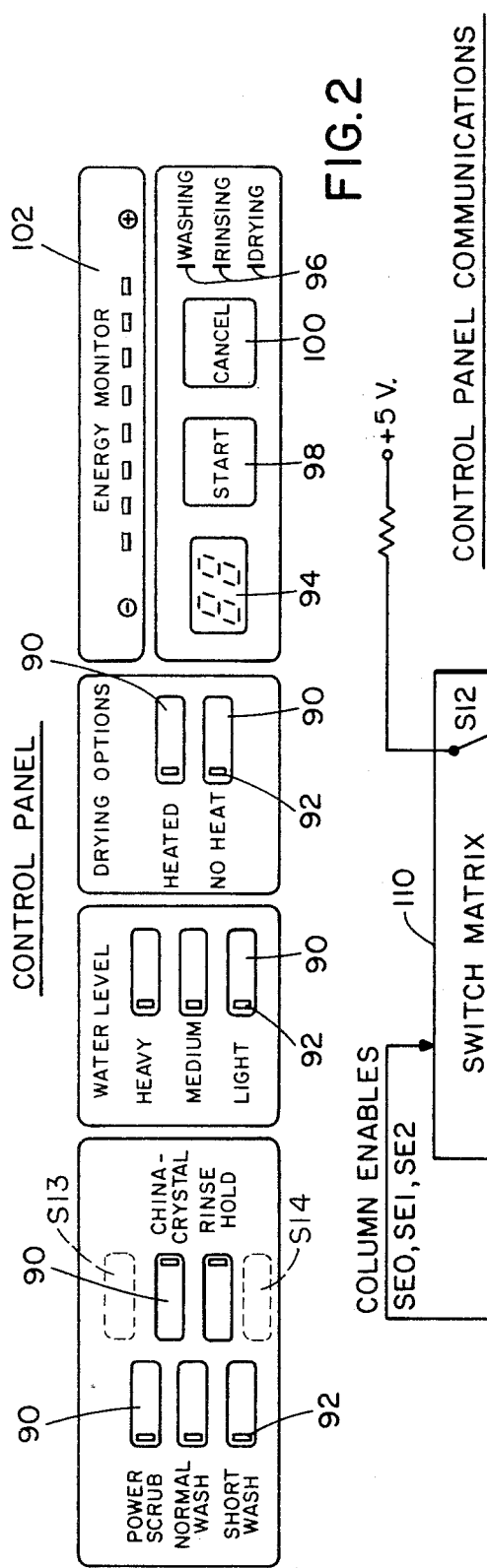
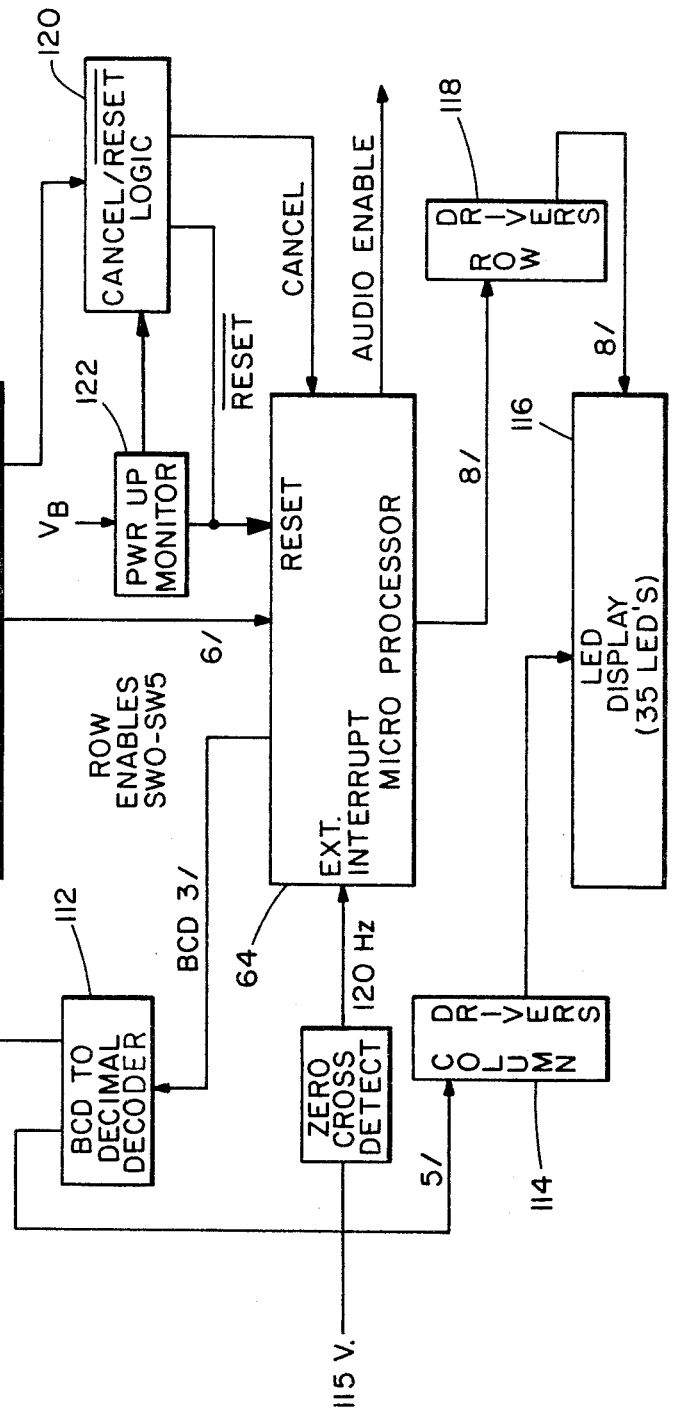

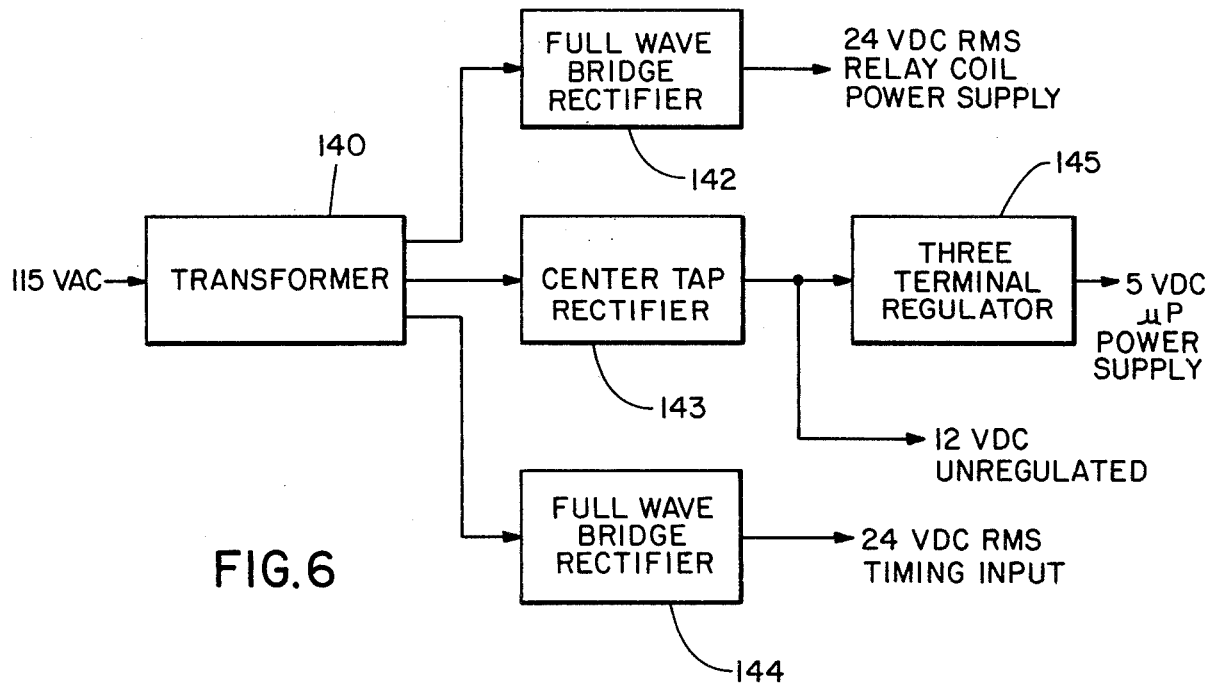
FIG. 6
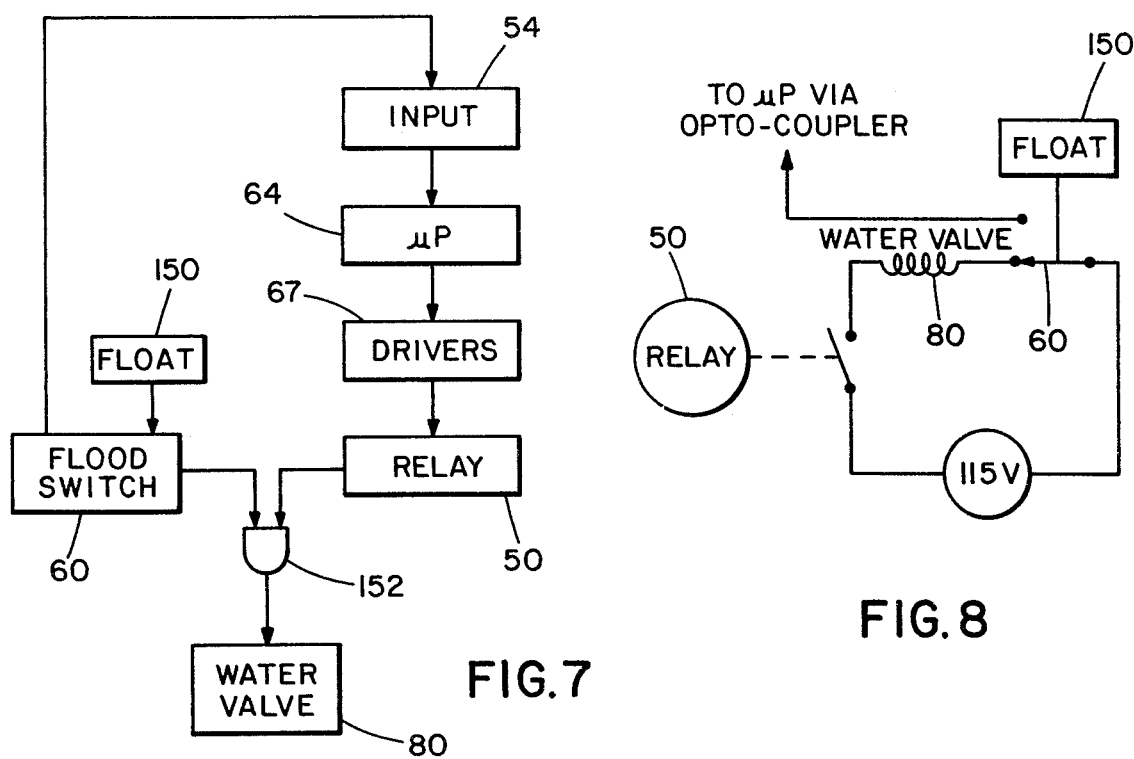
FIG. 7
FIG. 8

DRAIN FEEDBACK SYSTEM
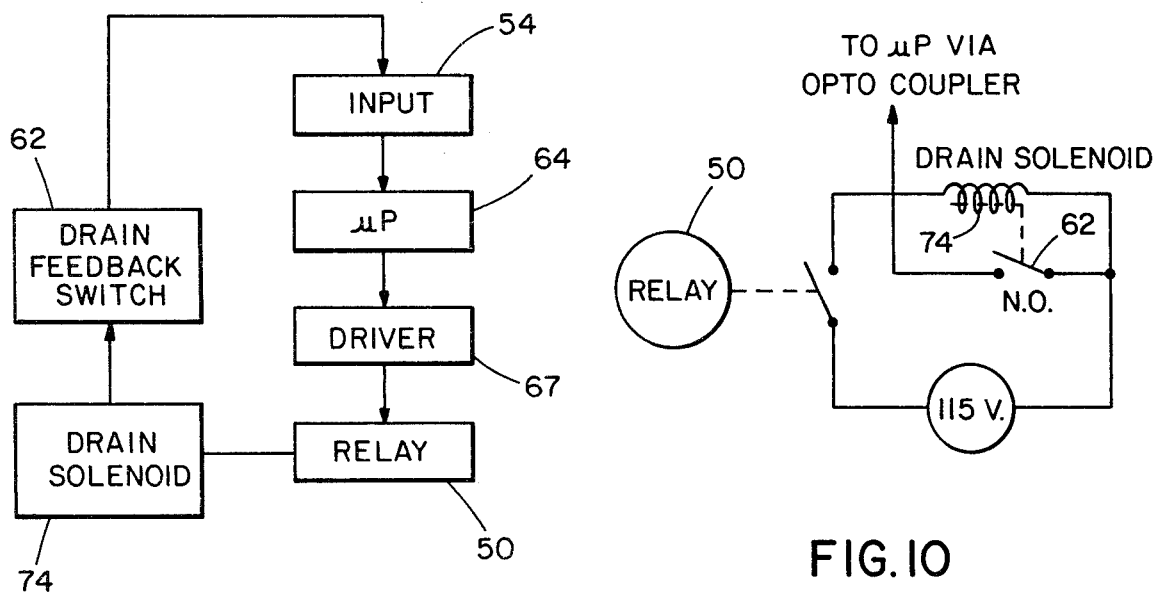
FIG.9
FIG.10
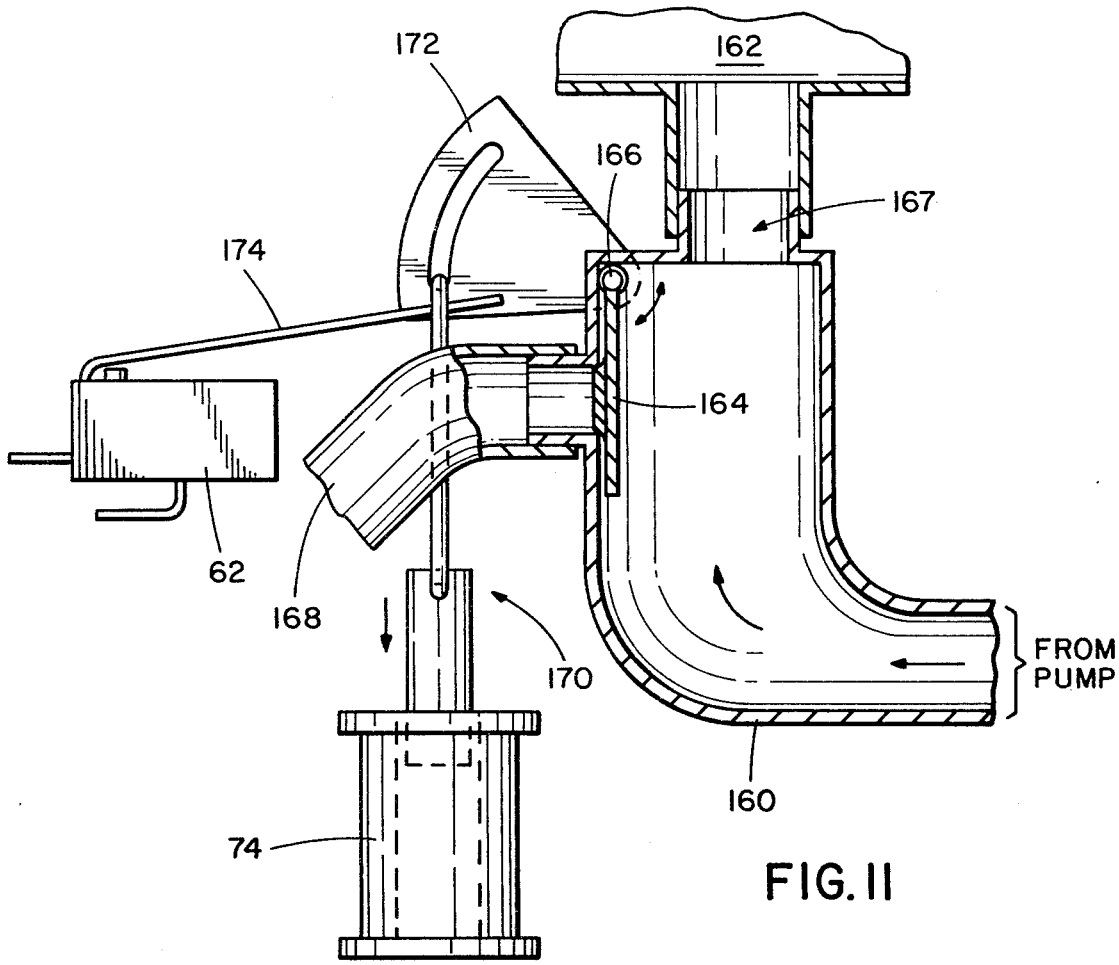
FIG.11

CANCEL DRAIN CONTROL

CANCEL DRAIN ROUTINE CONTINUED

SET TIMER FOR 100 SECONDS

IS DRAIN FB SW OPEN

HAS 100 SECONDS ELAPSED

IS DOOR OPEN

SET "LD" IN 7 SEGMENT REGISTER

RESET MACHINE

SET TO IDLE MODE

GO TO MAIN ROUTINE

CYCLE INTERRUPTION CONTROL

IS MODE = CURRENT FLOOD

IS FLOOD SENSOR ON

IS DOOR OPEN

RETURN

MICROPROCESSOR BASED CONTROL CIRCUIT FOR WASHING APPLIANCES WITH DIAGNOSTIC SYSTEM

CROSS-REFERENCE TO RELATED MATTER

The subject matter of this patent application relates to commonly-assigned, copending patent applications entitled "Microprocessor Based Control Circuit for Washing Appliances" Ser. No. 970,697, and "Microprocessor Based Control Circuit for Washing Appliances with Overfill Protection" Ser. No. 970,696, by the same inventor and filed on the same date hereof.

BACKGROUND OF THE INVENTION

This invention relates to the field of control circuits for consumer appliances. More specifically, it relates to control circuits for home washing appliances, such as dishwashers and clothes washing machines. Typically, these appliances are controlled by a mechanical, electromechanical or electronic sequencer. Thus, at a selected time on a rotating drum a water solenoid is actuated to fill the washing tube, at a later time a circulate cycle is initiated to circulate the water around the clothes or the dishes, and still later a drain cycle is initiated to remove the dirty water. These basic cycles are repeated to effect washing and rinsing in a well known manner.

In the usual electromechanical sequencer it is not possible to utilize feedback information to effect subsequent system operation as, for example, where an overfill or a drain blockage occurs. In such a case the sequencer will progress through its cycles regardless of system malfunction. Thus, for example, if the drain is clogged the system will nevertheless continue filling the appliance with water even resulting in a flood condition often causing damage to the machine and surrounding structures. Additionally, if draining is effected in less time than set in the sequencer the pump motor nevertheless continues to function often leading to excessive wear.

In addition to these disadvantages resulting from the fixed nature of electromechanical sequencers there is the lack of ability to include diagnostic cycles to detect and identify machine malfunctions to facilitate repair. These devices also become unduly complicated when it is desired to include a large number of user options on the appliance as, for example, several washing, rinsing and drying cycles. The permutations of these user options can easily exceed 30 and the hard wired circuitry necessary to interface with electronic, much less electromechanical sequencers, becomes prohibitively complex and expensive.

In order to obtain an improved control circuit for washing appliances it is desired, therefore, to provide a system which can handle a large number of user options, can detect serious malfunctions and prevent flooding, can detect other malfunctions and provide diagnostic information and which can jump to the next operation cycle as soon as a drain cycle has been completed. It is accordingly an object of the present invention to provide a microprocessor based control system for a washing appliance capable of achieving these advantages.

It is an object of this invention to provide a microprocessor based control circuit for a washing appliance which includes a diagnostic capability responsive to a service technician input and which may be rapidly advanced or "stepped" through the usual operating cycle sequence to facilitate diagnosis and repair.

It is a further object of this invention to provide a diagnostic system within a microprocessor based control circuit of a washing appliance which is responsive to operator input and control for testing each operating cycle of the appliance in sequence to verify correct operation of the appliance.

It is yet another object of this invention to provide a diagnostic system in a washing appliance including a microprocessor based control circuit which utilizes the malfunction detection capabilities of the control circuit to facilitate diagnosis and repair of the appliance.

Other objects and advantages of the invention will be apparent from the remaining portion of the specification.

SUMMARY OF THE INVENTION

The foregoing and other objects and advantages are accomplished by providing a microprocessor based control circuit for appliances such as dishwashers which employ a microprocessor programmed to respond to user selected options to determine the operating sequence of the appliance. The control circuit includes feedback systems which permit the detection and indication of fault conditions such as overfill or drain blockage and which initiate protective responses from the microprocessor to prevent flooding or damage to the appliance. The circuit includes a diagnostic system for facilitating diagnostic and repair of the appliance. The diagnostic system includes a diagnostic routine which sequences through the usual operating cycles in response to operator input and may be advanced through the cycles at the operator's discretion. Any appliance malfunctions detected by the feedback system are displayed on a control panel as a diagnostic routine is executed.

BRIEF DESCRIPTION OF THE DRAWINGS

FIG. 3 is a block diagram indicating the flow paths of data between the inputs, displays and the microprocessor.

FIG. 6 is a block diagram of the DC power supply.

FIG. 7 is a block diagram useful in understanding the flood detection system.

FIG. 8 is a schematic diagram of the flood detection circuit.

FIG. 9 is a block diagram useful in understanding the drain feedback system.

FIG. 10 is a schematic of the drain feedback circuit.

FIG. 11 is a sectional view through the drain system of a dishwasher illustrating the details thereof.

FIGS. 14, 15, 16, 16A, 17, 17A, 18, 19, 20, 20A, 21, 21A, and 21B are flow diagrams indicating the program sequence the microprocessor executes during each phase of the system operation.

DETAILED DESCRIPTION

Figure 1:
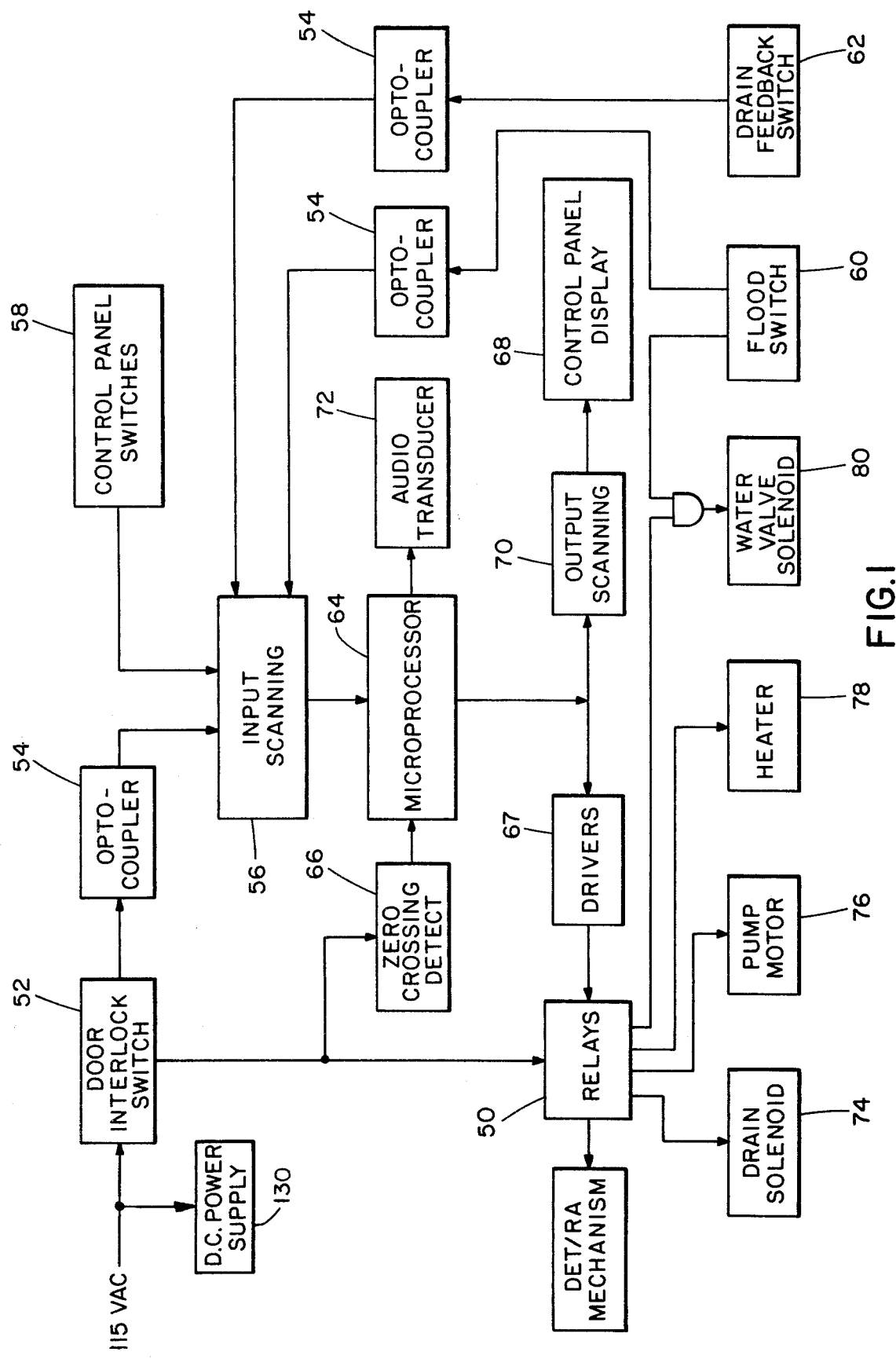
FIG. 1 is a functional block diagram of the microprocessor based control circuit according to the present invention.

Referring now to FIG. 1, a functional block diagram of a control circuit according to the invention is illustrated. The system is suitable for consumer appliances, such as dishwashers, clothes washers and similar devices which can be controlled by means of relays to activate motors and solenoids. The embodiment to be described in this specification is particularly suitable for a dishwasher and it will be apparent to those skilled in the art that, with slight modifications, the system can readily be adapted to clothes washers.

Power to the system is provided from a conventional outlet and is applied to the relays 50 through a door interlock switch 52. The power is applied to a power supply circuit, illustrated in FIG. 6, to generate the various DC voltages required by the microprocessor and the associated logic circuitry. The door switch if connected via an optocoupler 54 to an input matrix 56. Additional inputs to the matrix 56 include: control panel switches 58 by which the machine user selects the desired cycle operations; flood switch 60; and drain feedback switch 62. Alternately, the door, flood and drain switches may bypass the input scanning network 56, discussed in connection with FIG. 4, and be provided to appropriate input ports of the microprocessor 64.

In either case the five sources of inputs which are monitored by the microprocessor may be summarized as: inputs from the control panel 58, the door interlock 52, the flood switch 60, the drain feedback 62, and a zero crossing detector 66 used for generating external interrupts in the microprocessor. Responsive to these inputs and based on the control program stored in the microprocessor, three types of output functions are performed: The microprocessor provides power control by activating selected ones of the relays 50 through relay drivers 67; it updates a control panel display 68 via an output scanning matrix 70; and it drives an audio transducer to provide audio feedback during cycle selection by the user.

In the case of a dishwasher embodiment, the relays 50 controlled by the microprocessor close circuits to a drain solenoid 74, a pump motor 76, heater 78, and a water valve solenoid 80, each relay in set 50 being uniquely associated with one of these circuits. As indicated in FIG. 1, the water solenoid is logically ANDED with the flood switch 60 such that, if overfill is detected, the water valve is immediately de-energized.

The optocouplers 54 utilized for connecting door, flood and drain feedback switches to the input scanning 56 or, alternatively, directly to the microprocessor, serve as isolating elements to prevent false triggering in a manner well known in the art. Such elements are commercially available and, for example, the following component may be utilized: G.E. H11AA2.

The microprocessor 64 may similarly be a commercially available product and, for purposes of illustrating a dishwasher embodiment of the invention, the description will be based upon the use of a single chip 3870 microprocessor manufactured by Mostek or Motorola. The following technical literature is available regarding the 3870 microprocessor and is hereby incorporated by reference: Mostek F8 Microprocessor Devices Single Chip Microprocessor Computer MK3870, July 1977. The device is an eight bit microprocessor containing approximately a 2K read only memory (ROM), a small random access memory, and four bi-directional I/O ports. The chip includes four ROM address registers which serve as the program counter, stack registers, data counter, and auxiliary data counter. The firmware program provided in the 2K on board ROM is described in connection with FIGS. 13 through 16, 16A, 17, 17A, 18, 19, 20, 20A, 21, 21A and 21B.

CONTROL PANEL

Figure 2I:
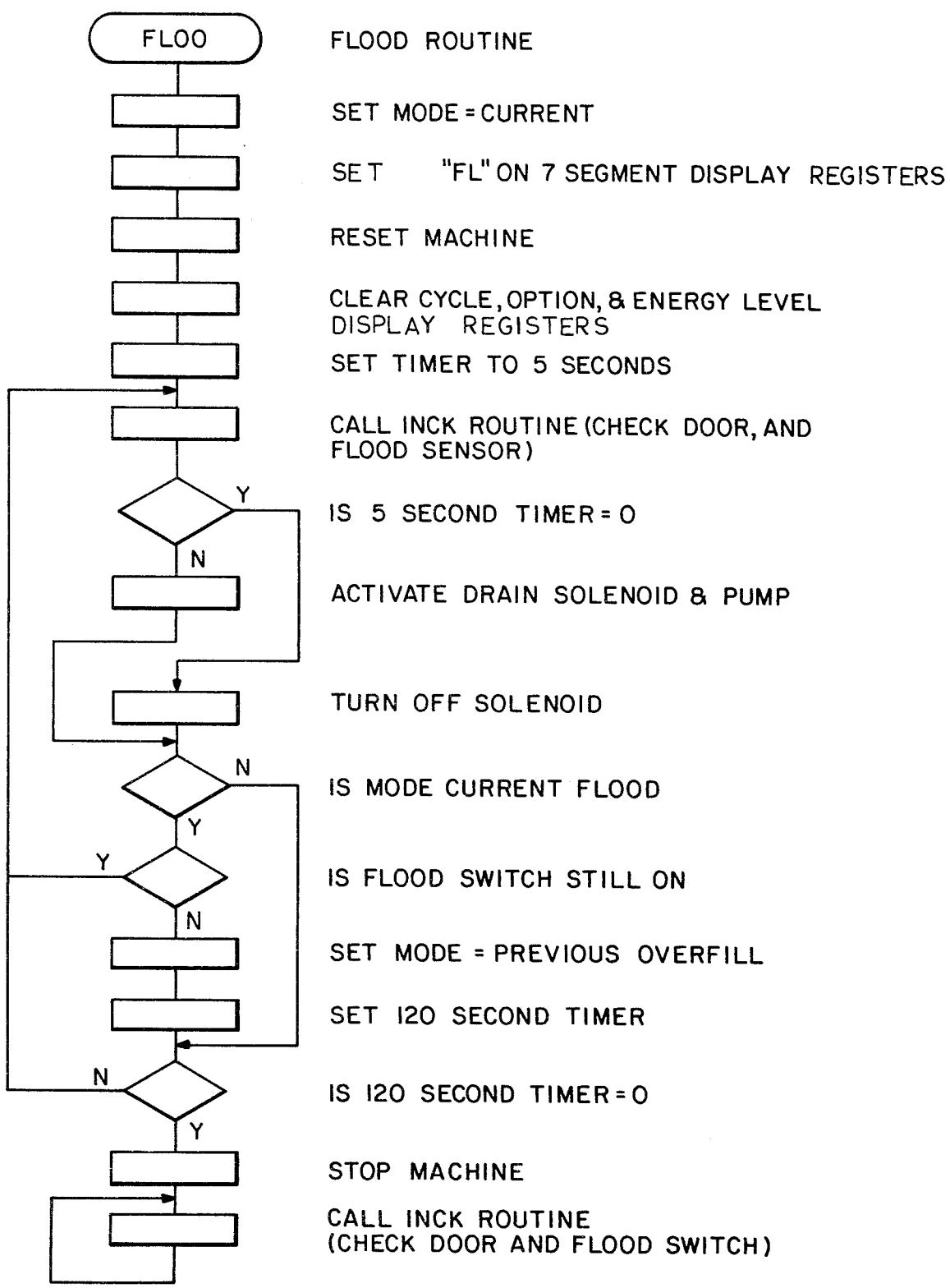
FIG. 2 is an illustration of the user control panel for operating a dishwasher appliance by means of the present invention.

Referring now to FIG. 2, a user control panel is illustrated containing the control panel switches and displays by which the user can interface with the control circuit and the controlled application. The control panel switches are illustrated in FIG. 2 as a plurality of membrane touch switches 90. When touched, a circuit is created producing a signal to the microprocessor. In this manner the user can select one of a variety of washing cycles of the usual type offered as, for example, normal wash, short wash, rinse and hold. In addition, the water level can be selected as can the use of heat or air drying. Located adjacent each membrane switch is a light emitting diode (LED) 92. When a membrane switch has been touched and the input received and accepted by the microprocessor, an output is produced illuminating the appropriate LED 92 to confirm to the user that the control circuit has accepted a desired cycle option.

The control panel also contains a two digit seven segment display 94 and three additional LEDs 96 which indicate the current portion or progress in the cycle being executed, i.e., washing, rinsing, and drying. The seven segment display is updated by the microprocessor and always displays either the time to the end of the cycle or one of the diagnostic codes to be described. Start and cancel buttons 98 and 100 initiate operation of the appliance or interrupt operation, repectively, and these buttons, as with switches 90, communicate with the microprocessor through the matrix illustrated in FIG. 4.

In an effort to encourage the user to select cycle options which are energy efficient the panel is provided with a visual energy monitor 102 comprising a set of LEDs arranged in a horizontal row. Based on the options selected, the microprocessor determines and illuminates the appropriate number of LEDs corresponding to the relative energy usage. The more energy that a given cycle requires the greater the number of LEDs that will be lit.

CONTROL PANEL COMMUNICATIONS

Figure 4:
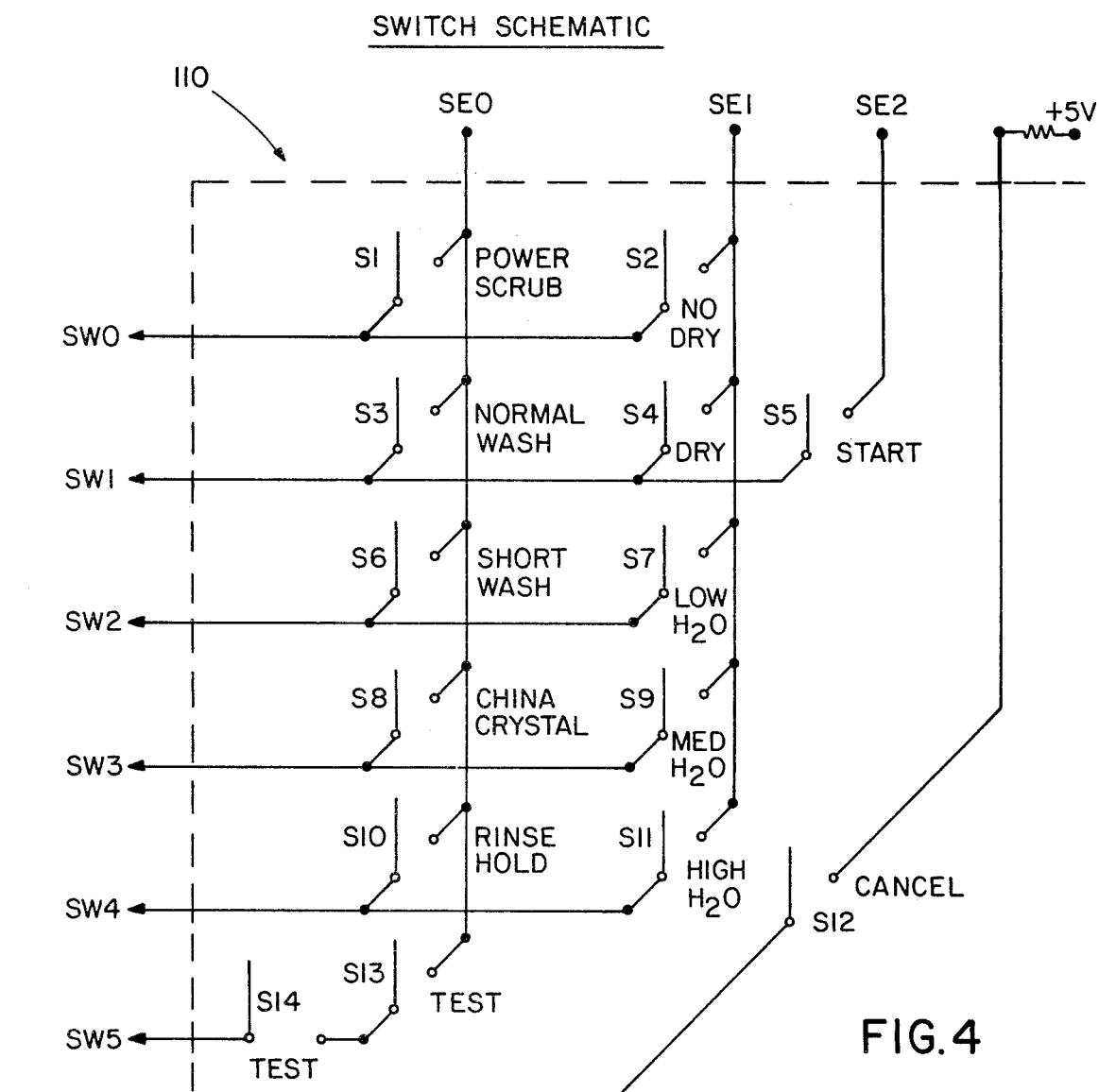
FIG. 4 is a schematic of the input switch matrix for selecting cycle options.

FIG. 3 is a block diagram similar to FIG. 1 providing details with respect to the data paths to and from the microprocessor and the various peripheral devices. As illustrated in FIG. 4, the membrane multiplexed switches on the control panel are connected in a switch matrix for communication with the microprocessor. The matrix includes six rows labelled SW0 through SW5 and three columns labelled SE0 through SE2. Each membrane switch 90 on the control panel, with the exception of cancel switch, is connected across a row and column of switch matrix 110 to define a unique digital code combination. Each switch corresponds to a different selectable option as, for example, switch S3 is the normal wash switch while switch S4 is the heated dry switch. If switch S3 is pressed, a circuit is completed connecting row SW1 to column SE0, which circuit produces the digital code detected by the microprocessor. A similar statement is true with respect to each of the remaining switches 110 except for switch S12 which is the cancel switch. Switches S13 and S14 are utilized by service personnel to initiate the operation of a test cycle contained in the microprocessor ROM. The test program is described in connection with the firmware disclosed in FIGS. 13 through 16, 16A, 17, 17A, 18, 19, 20, 20A, 21, 21A and 21B.

Each row of the matrix 110 is connected as an input to the microprocessor 64. The three columns are outputs from the microprocessor applied to the matrix via a BCD to decimal decoder 112. These column outputs are also provided to a column driver 114 used to drive the LED display 116 on the control panel. Similarly, the microprocessor outputs eight row lines through a row driver 118 to complete a circuit to the LED display.

As previously indicated, the cancel switch S12 is not part of the membrane switch matrix but is connected between a source of DC voltage and cancel-reset logic 120 to be described. When the cancel switch is closed an external reset of the microprocessor is performed causing interruption of the cycles in process, draining of water in the appliance and a reset of the microprocessor occurs. The microprocessor is also reset each time power is applied to the unit by means of a power up monitor 122 in a conventional manner.

DOOR INTERLOCK SYSTEM

Figure 5:
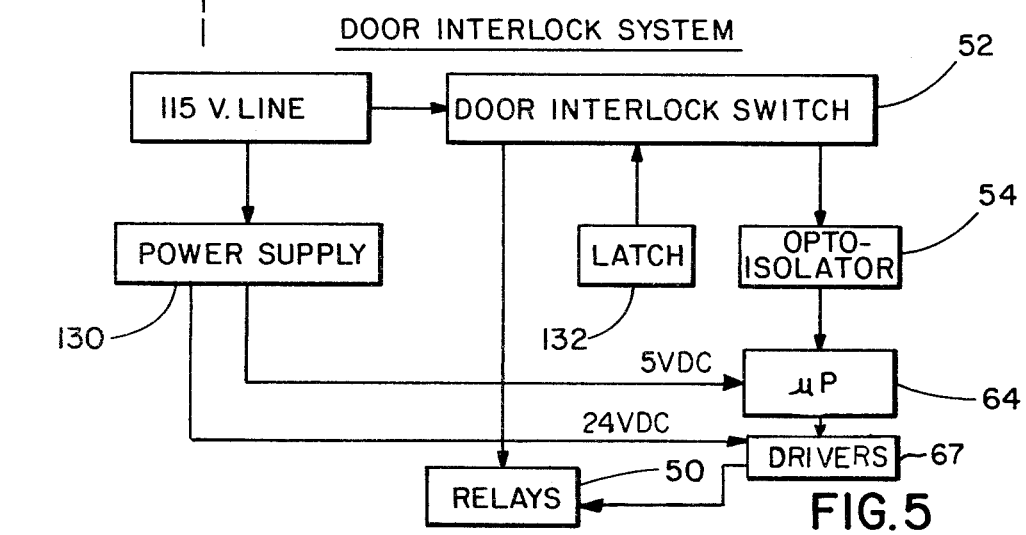
FIG. 5 is a block diagram useful in understanding the door interlock system.

Referring to FIG. 5, the pertinent portions of the FIG. 1 block diagram are reproduced which relate to the door interlock system. The line voltage is applied to the door interlock switch 52 and to the power supply 130 described in connection with FIG. 6. A mechanical latch 132 controls operation of switch 52 such that when the dishwasher door is open, power is removed from the switching contacts of relays 50. By means of an optoisolator 54 the door switch status is communicated to the microprocessor 64 which then de-energizes the switching contacts of relays.

It should be noted that power supply 130 is not connected through the door switch and thus the microprocessor always receives power regardless of the state of switch 52 and constantly monitors the operation of the appliance whether or not it is operating. This facility permits the detection of an overfill condition which might occur while the machine is not in operation by virtue of a faulty water valve. In such a case, a flood control cycle would be automatically initiated. When the door switch is closed, power is applied to the relays permitting their selective actuation by the microprocessor through drivers 67.

POWER SUPPLY

FIG. 6 illustrates the power supply 130 which is conventional in nature and will be only briefly described. A transformer 140 provides outputs to bridge rectifiers 142 and 144, and center tap rectifier 143. Rectifier 142 produces a 24 volt DC power output for driving the relay coils. Rectifier 143 provides an output to a three terminal regulator 145 producing a five volt DC power supply for the microprocessor. Rectifier 143 also produces a 12 volt DC supply for the audio and reset circuits. Rectifier 144 produces 24 volts DC for the timing circuit 66.

FLOOD CONTROL SYSTEM

Referring to FIGS. 7 and 8, the flood control (or overfill) system according to the invention is illustrated. FIG. 7 is a reproduction of the appropriate blocks of FIG. 1 relating to the flood control while FIG. 8 is a schematic of the flood feedback circuit. The flood switch 60 is controlled by a float 150 customarily located within the washing tub at a level so that excess water in the tub will cause the float to rise and open the flood switch connected thereto. The flood switch is connected in series with the water solenoid 80 in a normally closed configuration. When the flood switch opens it interrupts the circuit path from the associated relay 50 to the water solenoid 80 and immediately shuts off the water supply to the appliance. This function is indicated in FIG. 7 by AND gate 152. When switch 60 opens it provides an input via the optoisolator 54 to the microprocessor either through the input matrix 56 or, as illustrated in FIG. 7, directly to the microprocessor through an available I/O port. The microprocessor, upon detecting the overfill or flood condition, executes a flood control routine described in connection with FIGS. 21, 21A and 21B. In general, the flood control routine discontinues normal operation of the appliance and initiates a drain cycle which persists until flood switch 60 returns to its normally closed position indicating a safe water level in the appliance.

DRAIN FEEDBACK SYSTEM

FIGS. 9 and 10 illustrate the operation of the drain feedback system which serves to permit the microprocessor to accurately monitor the operation and condition of the drain system. The drain solenoid 74 is actuated by the associated relay 50 in order to initiate draining of water from the appliance. The mechanical arrangement of the drain system is illustrated in FIG. 11. When the solenoid is operated, the drain feedback switch 62 is closed thereby providing an input to the microprocessor 64 via optoisolator 54. The feedback switch is periodically polled during the course of the drain cycle. The drain diverter valve, the linkage of which controls actuation of the drain switch, is mechanically arranged to permit the switch to open when water has been pumped out of the appliance. Thus, during normal operation, the drain feedback switch 62 should, initially, be closed when the solenoid is actuated and subsequently, within predictable time limits, the switch should open indicating completion of the drain cycle. If the switch fails to go on at the beginning of a drain cycle, the microprocessor identifies a drain system failure (DS). If the switch stays closed longer than normal for a specified quantity of water, the microprocessor identifies a long drain situation (LD) indicative of partial drain blockage or other service problem. Similarly, if the switch stays closed for an unlimited period of time the microprocessor identifies a plugged drain (PD) situation and terminates operation of the appliance to prevent flooding. This operation is detailed in connection with FIGS. 17 and 17A.

FIG. 10 illustrates the schematic arrangement of the drain feedback circuit indicating the mechanical ganging of the feedback switch 62 to the drain solenoid 74 via the drain diverter valve to be described.

DRAIN FEEDBACK MECHANICAL DESIGN

Referring to FIG. 11, a suitable drain system mechanism for use with the present invention is illustrated.

This mechanical design is intended for a dishwasher appliance and in some respects is conventional. It will be recognized that other drain arrangements are possible as long as the drain feedback switch 62 is positioned to detect operation of the drain diverter valve.

In the usual dishwasher construction the pump housing defines a water flow path from a pump (not shown) upwardly through a channel 160 into the tub of the appliance indicated at 162. In this manner water is forced into the appliance for washing and rinsing purposes. Water is withdrawn from the tub through openings (not shown) to complete the circuit whereby steady water circulation is obtained. When it is desired to discharge the water from the appliance, a diverter valve 164, which is hingedly attached to the housing at point 166, is positioned across the opening 167 to divert water from the tub into a drain line 168. Except when draining, the diverter seals the drain line 168 to prevent water from leaking out of the appliance.

Once the diverter valve has been moved to a horizontal position across the opening 167 the pressure of the water against the valve will maintain it in place until substantially all of the water has been discharged into the drain line. At that point the valve should automatically return to the FIG. 11 position resealing the drain line and permitting circulation between the pump and the appliance tub.

The diverter valve is controlled by the drain solenoid 74 to which it is connected to an armature assembly 170 and a linkage 172. As will be apparent, when the solenoid is energized the armature retracts into the solenoid rotating the linkage in the direction indicated by the arrow thus moving the diverter valve to its horizontal position.

According to one embodiment of the invention, the feedback switch 62 includes a finger 174 positioned in the path of the armature assembly whereby downward rotation of the assembly closes the switch and upward rotation opens the switch. The condition of the switch is monitored by the microprocessor in the manner described in connection with FIGS. 9 and 10. Based upon the state of the switch and the time elapsed from the beginning of the drain cycle, the microprocessor is programmed to detect drain system failures of the type previously indicated and, if necessary, to abort cycle operation to prevent flooding.

CANCEL-DRAIN LOGIC

Figure 12:
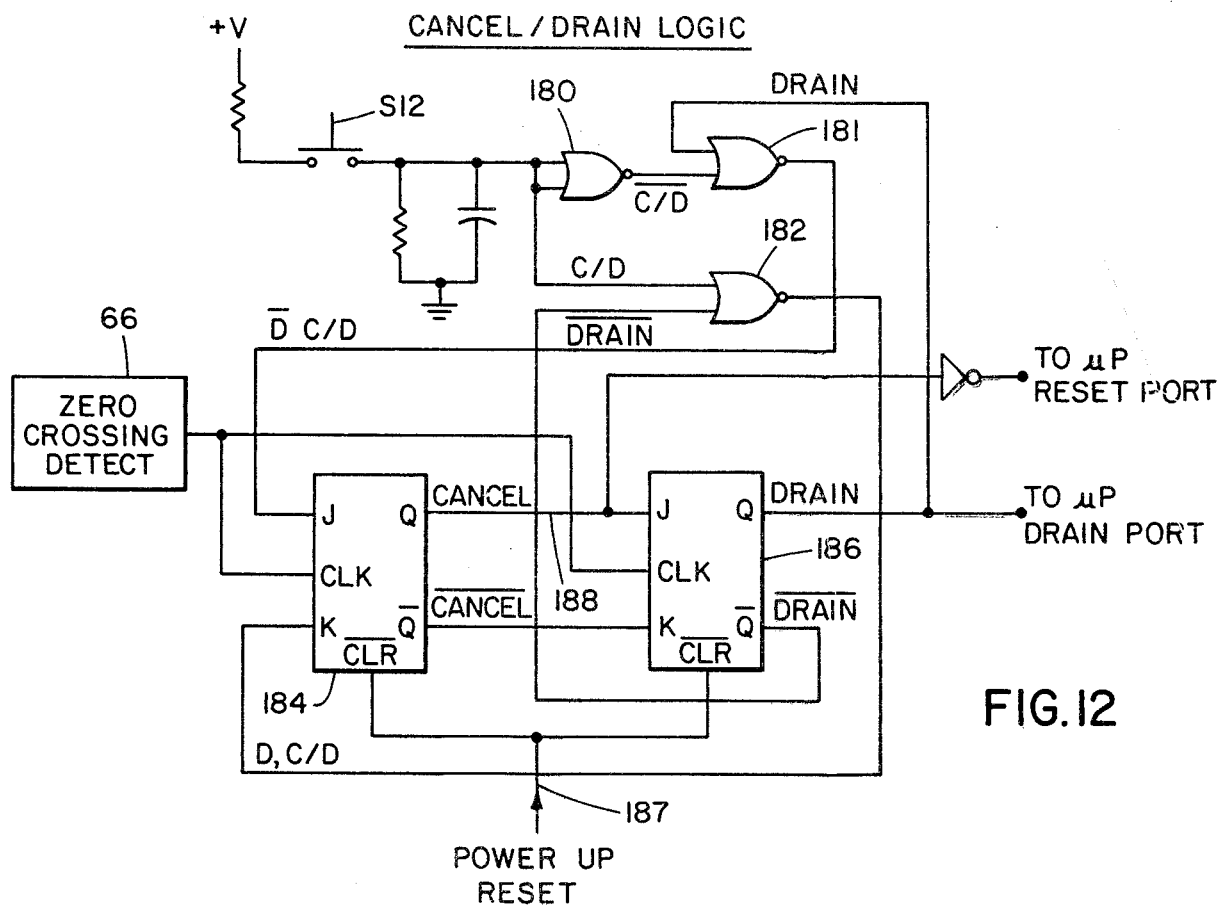
FIG. 12 is a circuit diagram of the cancel-drain circuit according to the invention.

Referring to FIG. 12 the cancel-drain logic 120 (FIG. 3) is illustrated. The purpose of the cancel-drain logic is two-fold. First, it interrupts any appliance cycle in progress by resetting the microprocessor. Second, it initiates a drain cycle to remove any water from the appliance before permitting further user operation. The logic of FIG. 12 accomplishes this by means of interconnection to the microprocessor reset port and to a microprocessor I/O port which is dedicated to detecting a cancel-drain signal for initiating a drain cycle. The FIG. 12 circuit includes three NOR gates 180, 181, and 182. Switch S12 (FIG. 4) is connected as the input to gate 180 which merely functions as an inverter. Switch S12 is also connected as one input to gate 182. The output of gate 180 is provided as one input to gate 181.

The outputs from gates 181 and 182 are provided to the J and K inputs, respectively, of a flipflop 184. The Q and $\overline{Q}$ outputs of flipflop 184 are connected to the J and K inputs of a second flipflop 186. The Q output of flipflop 186 is connected as the second input to NOR gate 181 while the $\overline{Q}$ output is connected as the second input to the NOR gate 182. The flipflops are clocked by the zero crossing detector 66 (FIG. 3) and the flipflops are cleared during power up by a reset signal provided on line 187.

Operation of the cancel-drain logic is as follows. When switch S12 is closed, a low signal (or a logical zero) is produced by gate 180 as an input to gate 181. The Q output of flipflop 186 is also low and, therefore, the output of gate 181 is high (or a logical one). This signal is applied to the J input of flipflop 184 producing a high Q output when the flipflop is clocked by the zero crossing circuit 66. This output, on line 188, is inverted and connected to the microprocessor reset port. When this signal goes high the microprocessor reset port goes low initiating a reset after S12 is released. The microprocessor begins stepping through the power up routine described in connection with FIG. 14. That routine includes an interrogation of the I/O port to which the Q output of flipflop 186 is connected. During the next clock cycle applied to the flipflops the high output on line 188 produces a Q output from the flipflops 186 signalling the microprocessor that a cancel-drain cycle is desired. This causes a branch in program execution to the cancel-drain routine described in connection with FIG. 20.

In order to reset the cancel-drain circuit it is necessary that the flipflops be reset and this is accomplished by the connection between the $\overline{Q}$ output of flipflop 186 and the input to gate 182. Thus, when the Q output goes high the $\overline{Q}$ output goes low producing a high output from gate 182. This output is applied to the K input of flipflop 184 effective for resetting both flipflops to their initial, low state.

FIRMWARE STRUCTURE

As indicated previously, the microprocessor utilized in the present invention is in a single chip device including an on board ROM in which the control program is permanently installed prior to shipment of the appliance to the user. Based on the disclosure given to this point, it is believed that a programmer or ordinary skill in the art could produce an appropriate firmware structure to implement the various operating cycles commonly found in washing appliances. Nevertheless, to insure that a complete disclosure of the invention is given, there follows a detailed description of the firmware structure employed and a discussion of the flow diagrams relating to each program routine necessary to implement an operative device. Based on the following disclosure, the development of specific program statements is a routine matter dependent upon the particular microprocessor selected, its corresponding instruction set and the desires of the designer in selecting the type of user selectable options which will be incorporated into the firmware. In the ordinary course of events it is contemplated that once the appliance has been delivered to an end user no change in the control program will be made. However, it is, of course, possible to make changes by substituting a new chip containing a revised program and thus field modification of the appliance to add additional options is contemplated.

Figure 13:
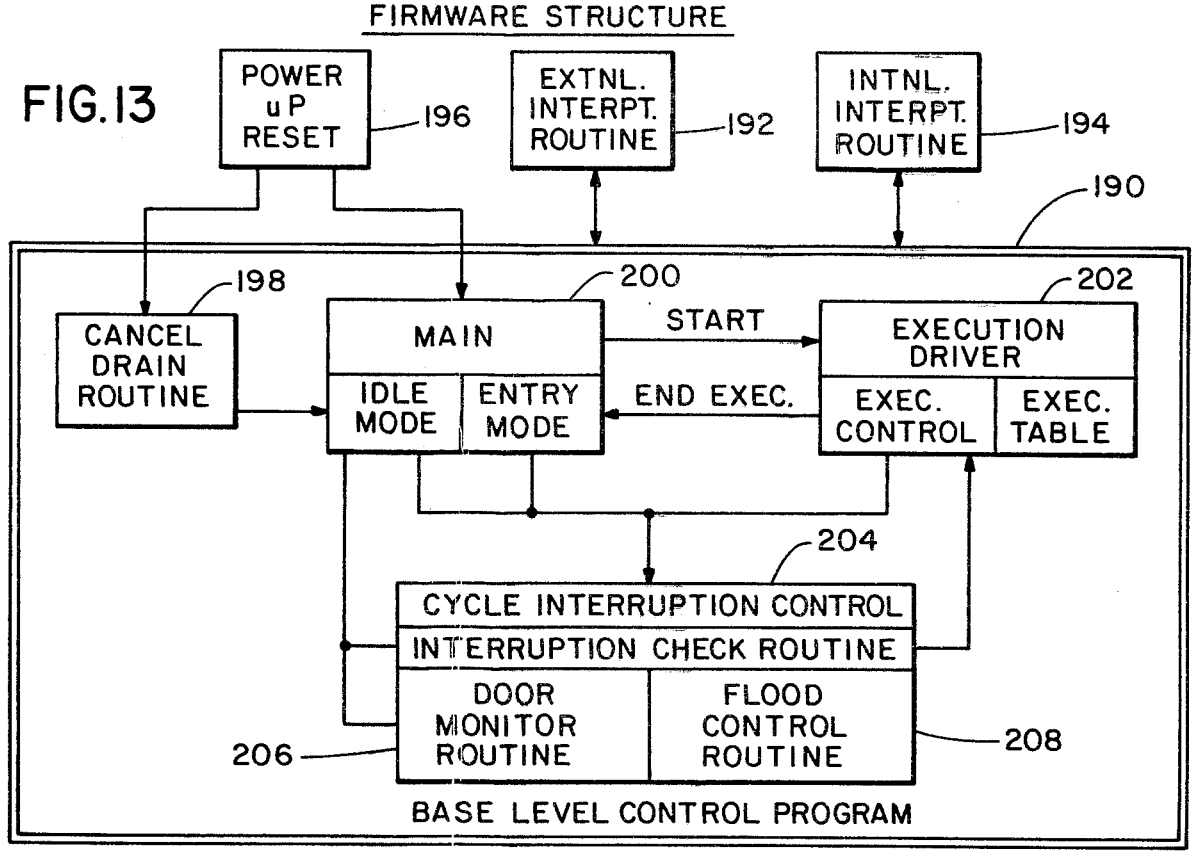
FIG. 13 is a block diagram of the computer firmware utilized in conjunction with the microprocessor.

Referring now to FIG. 13, the general arrangement of the firmware is illustrated. It consists of a base level program 190 subject to interruption by external interrupt routine 192 and internal interrupt routine 194. Additionally, upon power up, a power up reset routine 196 is performed prior to entry into the base level control program. The base level program includes a number of software routines including the cancel-drain routine 198, a main routine 200, execution routine 202, and cycle interruption routine 204. The latter routine may be further divided into a door monitor routine 206 and a flood control routine 208. Each of the indicated routines will now be identified and briefly described in connection with the corresponding figure.

Figure 13A:
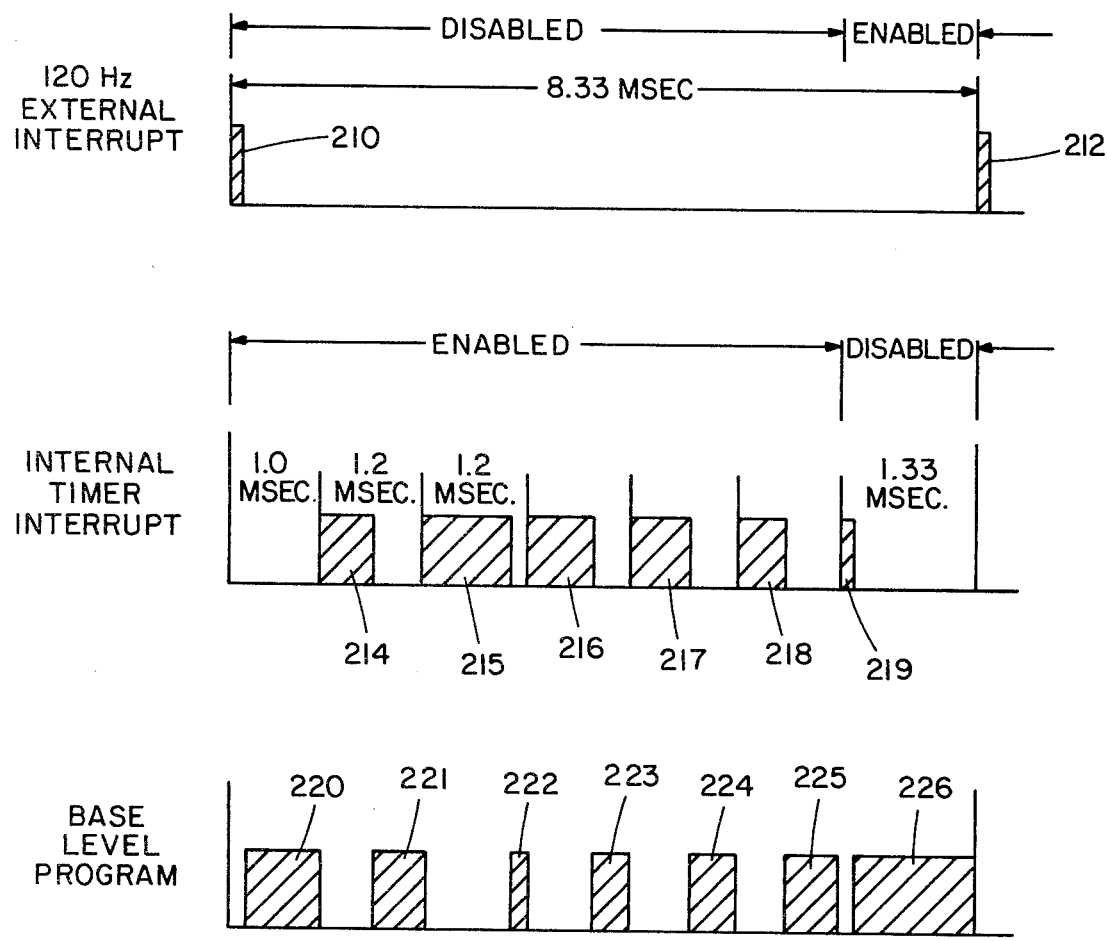
FIG. 13A is a timing diagram useful in understanding the operation of the microprocessor.

Turning to FIG. 13A, a system timing diagram is illustrated which indicates the interrelationship between standard line voltage, the interrupts and the base level program. U.S. line voltage has a frequency of 60 hertz, and thus a zero crossing will occur every 8.33 milliseconds. Each zero crossing produces an external interrupt, as indicated at 210 and 212. As will be described in connection with the interrupt program routines, every time an external interrupt occurs further external interrupts are prevented by disabling the external interrupt port of the microprocessor. This prevents extraneous noise on the power line from causing improper operation of the control circuit. This, after an external interrupt occurs, external interrupts are disabled for a substantial portion of the 8.33 millisecond interval.

During the period when external interrupts are disabled, internal interrupts generated within the microprocessor are enabled and indicated at 214 through 219. As will be described in connection with the internal interrupt routine, each of these internal interrupts are utilized for various purposes, such as updating the display and inputting option information. The final internal interrupt is effective for disabling further internal interrupts and re-enabling external interrupts in preparation for the next cycle.

In the time windows between internal interrupts the base level program 190 is performed by the microprocessor as well as during the period after the last internal interrupt but before the occurrence of the next external interrupt. Thus, base level execution occurs at points 220 through 226 as indicated.

POWER UP ROUTINE

Figure 14:
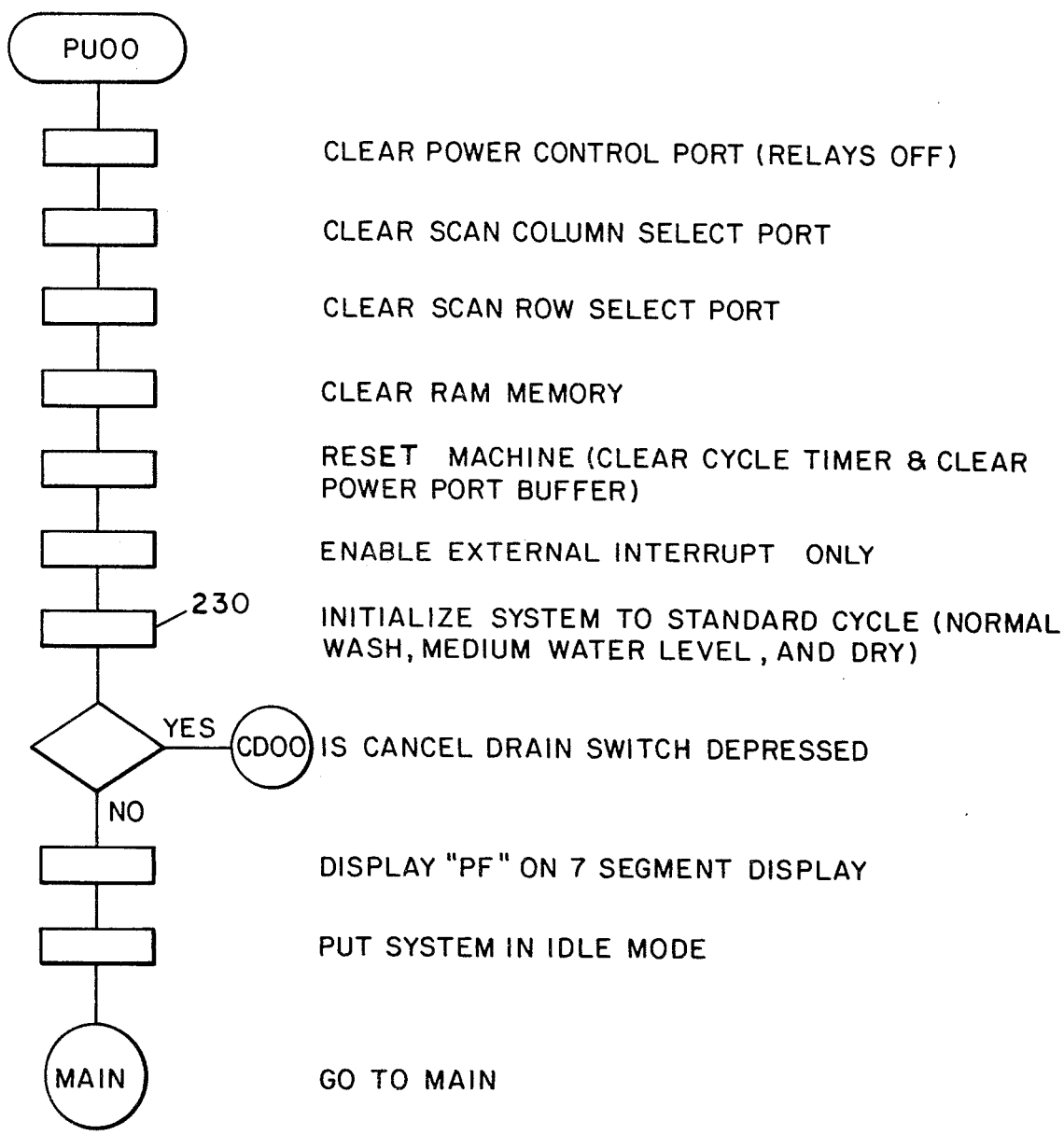
Figure 15:
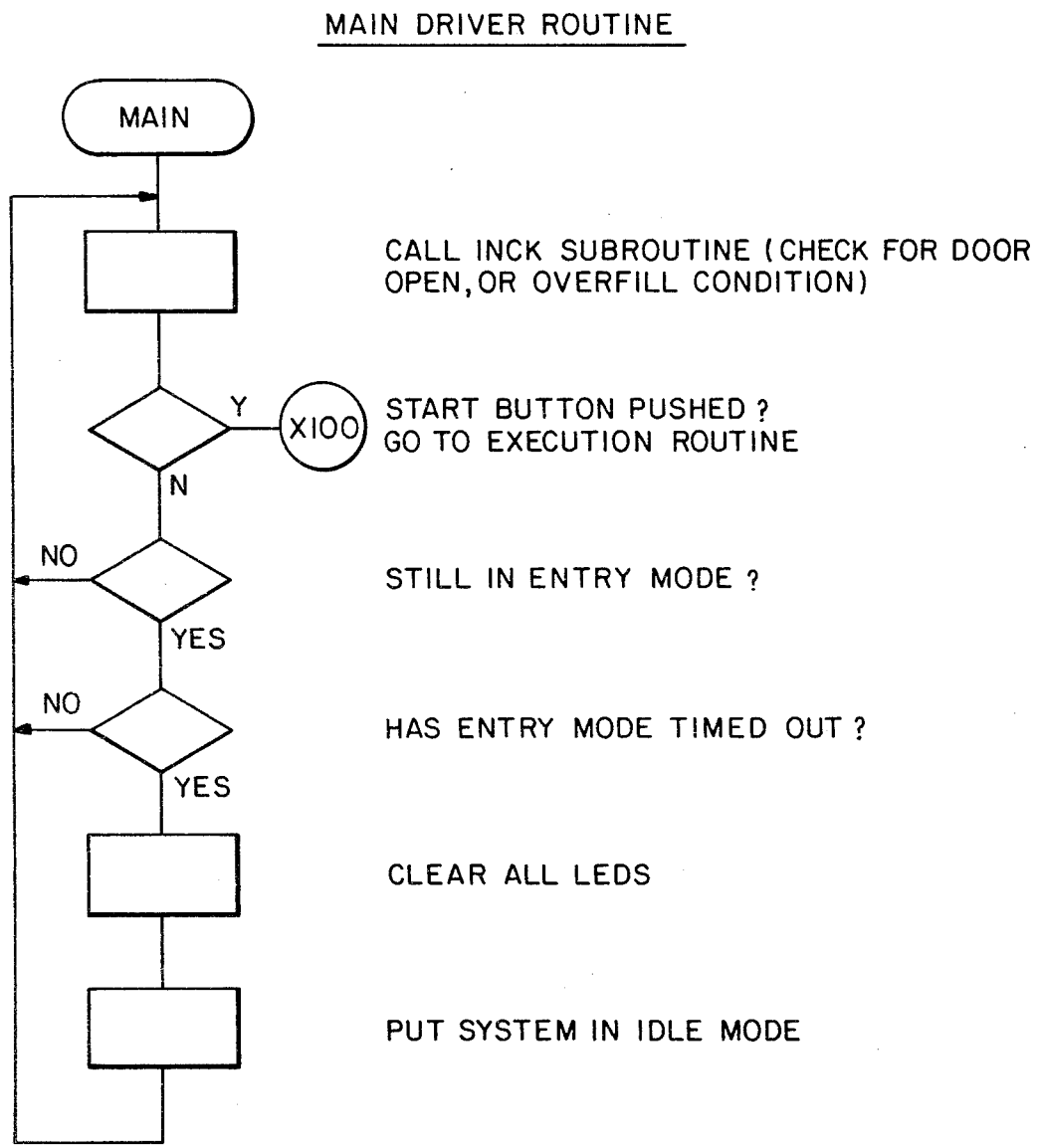

FIG. 14 discloses the flow diagram for the power up routine. The on board ROM contains instructions for effecting the logical steps indicated in FIG. 14 each time power is applied to the control circuit or a reset is desired. Summarizing the steps illustrated in FIG. 14, first the relays are turned off, the scan ports are cleared, the ram is cleared, the program timers and power control registers are initialized, and then the external interrupt is enabled. If desired, as indicated by box 230, the system may be initialized to a standard cycle as, for example, normal wash, medium water with drying. The program then checks the cancel-drain port discussed in connection with FIG. 12 to see if the cancel-drain switch S12 (FIG. 4) has been closed. If so, the program branches to the cancel-drain routine discussed in connection with FIG. 20. If not, the display indicates the letters PF on the seven segment display indicating a power failure and the system goes into the idle mode portion of the Main routine 200.

MAIN ROUTINE

Referring to FIG. 13, the main line routine (FIG. 15) is entered by any of the other routines upon completion or branching from such other routines. The main routine includes a branch to the cycle interruption control routine 204 to check for an open door or a flood condition and if neither condition exists, a return is effected. If the start button has been pressed and accepted, the main program causes a branch to the execution driver program 202. If not, the program places the machine in the entry mode whereby the user can operate the cycle selection switches on the control panel. The system continues to loop in the main program until a preselected time period has passed after which the display is blanked and the system enters the idle mode which is essentially an off condition except for the microprocessor.

EXECUTION DRIVER

Figure 16:
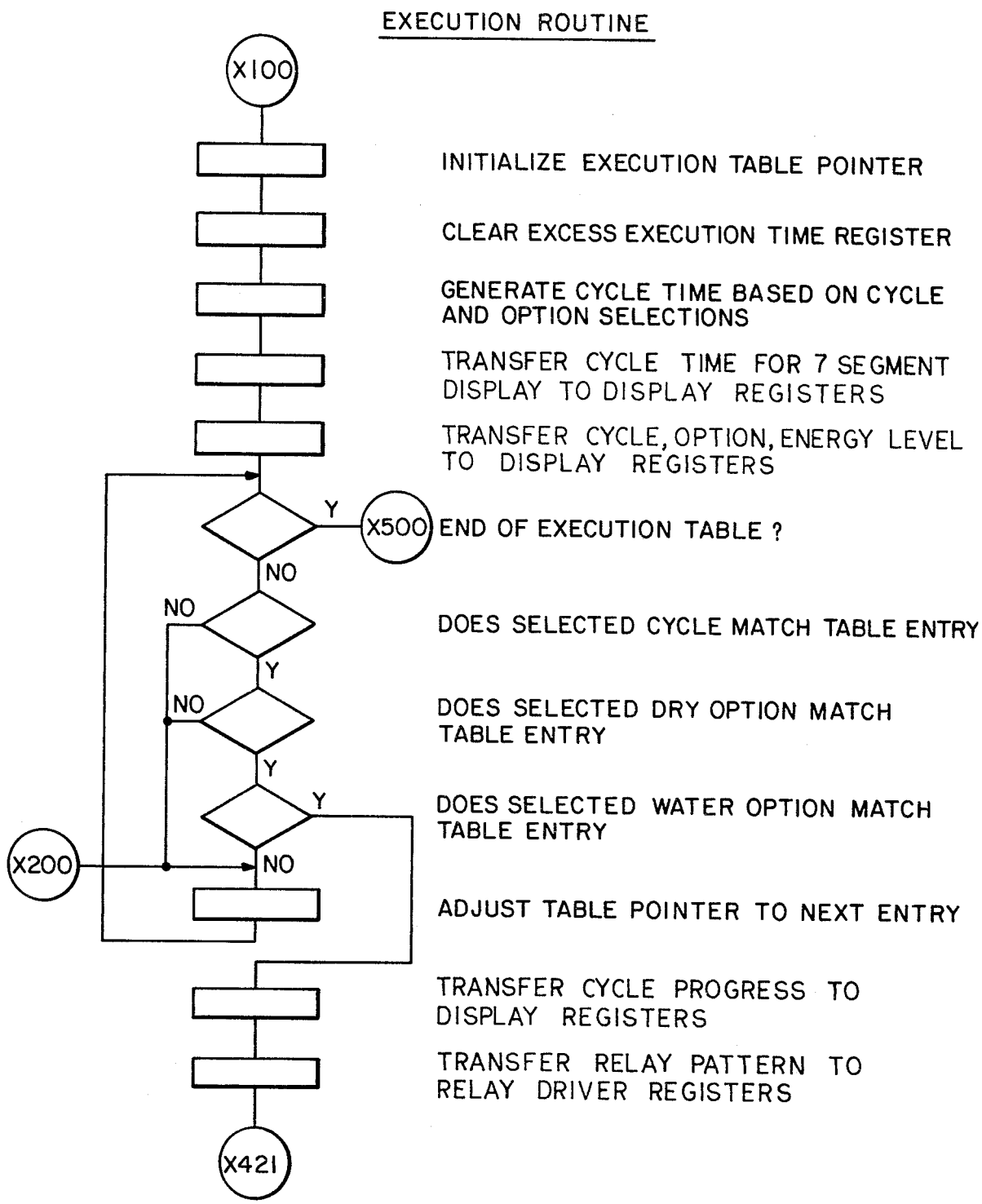
Figure 16A:
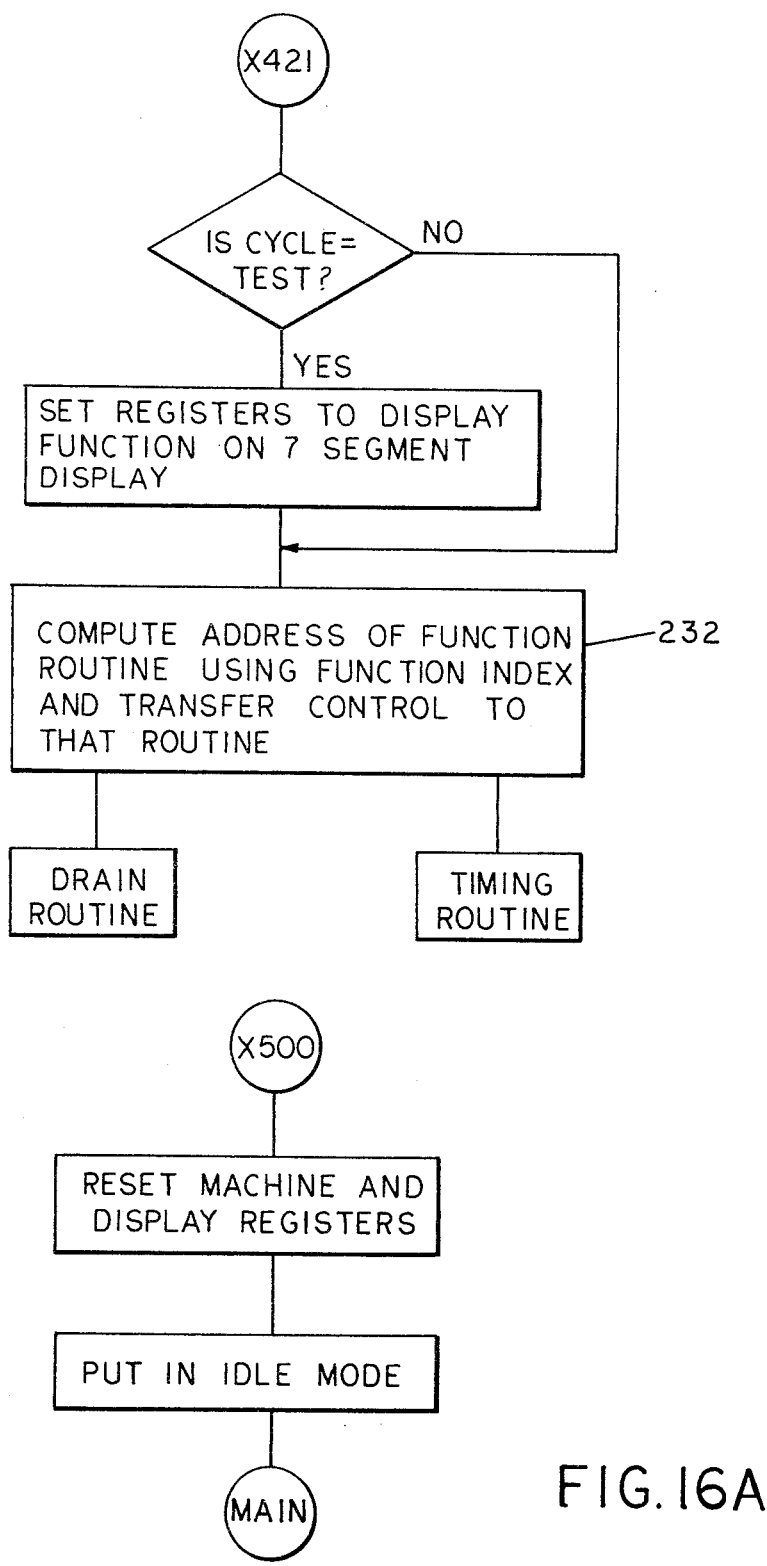

FIGS. 16 and 16A illustrate the execution routine. In summary, the microprocessor's internal timers are cleared and the stack pointer initialized. Next, the correct cycle times based on the cycles selected are generated from a look up table and stored in appropriate registers. The correct function sub-routine, wash, rinse, dry, drain, etc., is determined and a branch to that routine occurs at point 232 (FIG. 16A). The drain sub-routine is described in connection with FIG. 17. The timing sub-routine for the fill, circulate, detergent, rinse, aid trip and dry cycles is described in connection with FIG. 17A. Upon completing these sub-routines a return to the execution routine is effected at point X200. When execution is complete, a return to the main routine is accomplished at X500.

DRAIN ROUTINE

Figure 17:
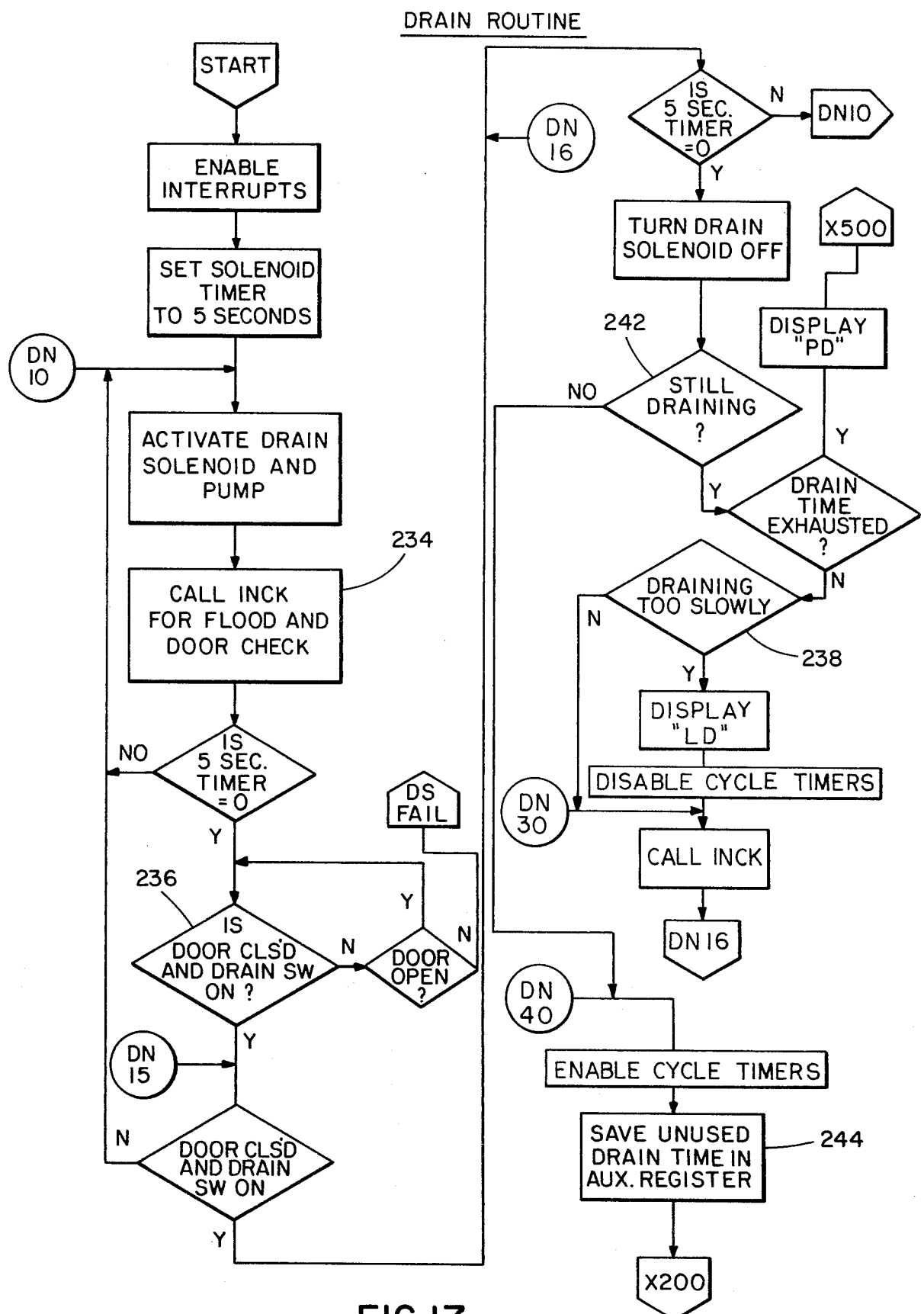

FIG. 17 illustrates the drain routine employed when a normal drain of the appliance is desired. During the course of the drain routines tests are performed on the drain feedback switch to detect drain system failure (DS), long drain (LD), and plugged drain (PD) conditions. If no fault conditions are detected upon completion of the drain cycle, execution returns to the execution routine at X200. The drain routine branches at point 234 to the INCK routine to detect possible flood or open door conditions. If neither is present, a return is effected and the drain solenoid 74 (FIG. 11) continues to be activated for five seconds. At the end of that time the drain switch 62 is interrogated at 236 to see if the diverter valve is correctly positioned. If not, a drain system failure is signalled and cycle operation terminates.

The time during which the drain switch is closed is monitored at 238 and, if excessive, draining continues with the front panel display indicating LD for long drain. If the switch remains closed at the end of the drain time PD is displayed at 240 and the cycle is interrupted due to a plugged drain.

A principal feature of the present invention and difference over the prior art is the diagnostic capability of the drain routine. The microprocessor based control circuit is capable of initiating a drain operation and then monitoring that operation on a real time basis to detect various malfunctions of the drain system. In the event of a long drain caused by partial blockage of the drain, the cycle continues to operate but the user is notified that service is required. In the event of a major failure of the drain system, as when the diverter valve fails to operate or the drain is plugged, the microprocessor terminates cycle operation to prevent flooding or damge to the system.

The drain function, during normal operation, continues only as long as necessary. This too is a distinct difference and advantage over conventional units. As soon as the drain switch returns to its normal position this is detected at 242 and the drain cycle is terminated. Any unused time in the normal drain cycle is transferred from the drain timing register to an auxiliary register at point 244 and the next cycle begins immediately. In prior control circuits if a drain cycle were set at, for example, 70 seconds and draining is completed in 50 seconds, the pump motor would remain on for an additional 20 seconds. This undesirable operation is avoided by the present invention. The excess time is not discarded, however, in order that the total cycle time be as initially programmed. The excess time is added to the next time insensitive cycle as, for example, a dwell period or a circulate period.

CYCLE TIMING ROUTINE

Figure 17A:
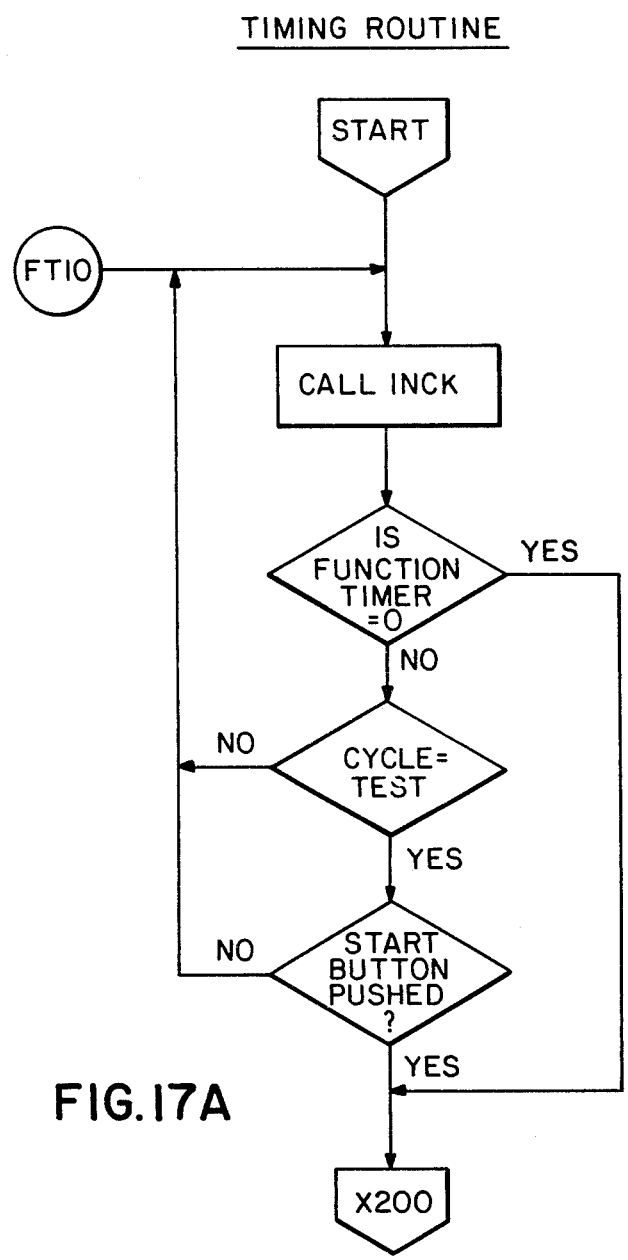

FIG. 17A is the cycle timing routine entered from the execution routine. This routine times the normal machine functions except the drain function. Upon time out control is transferred back to the execution routine at point X200.

EXTERNAL INTERRUPT ROUTINE

Figure 18:
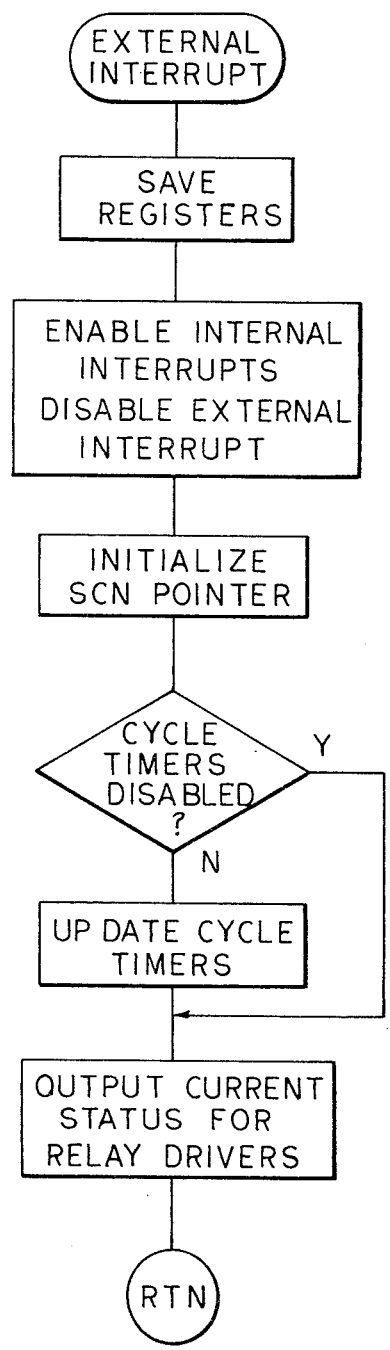
Figure 19:
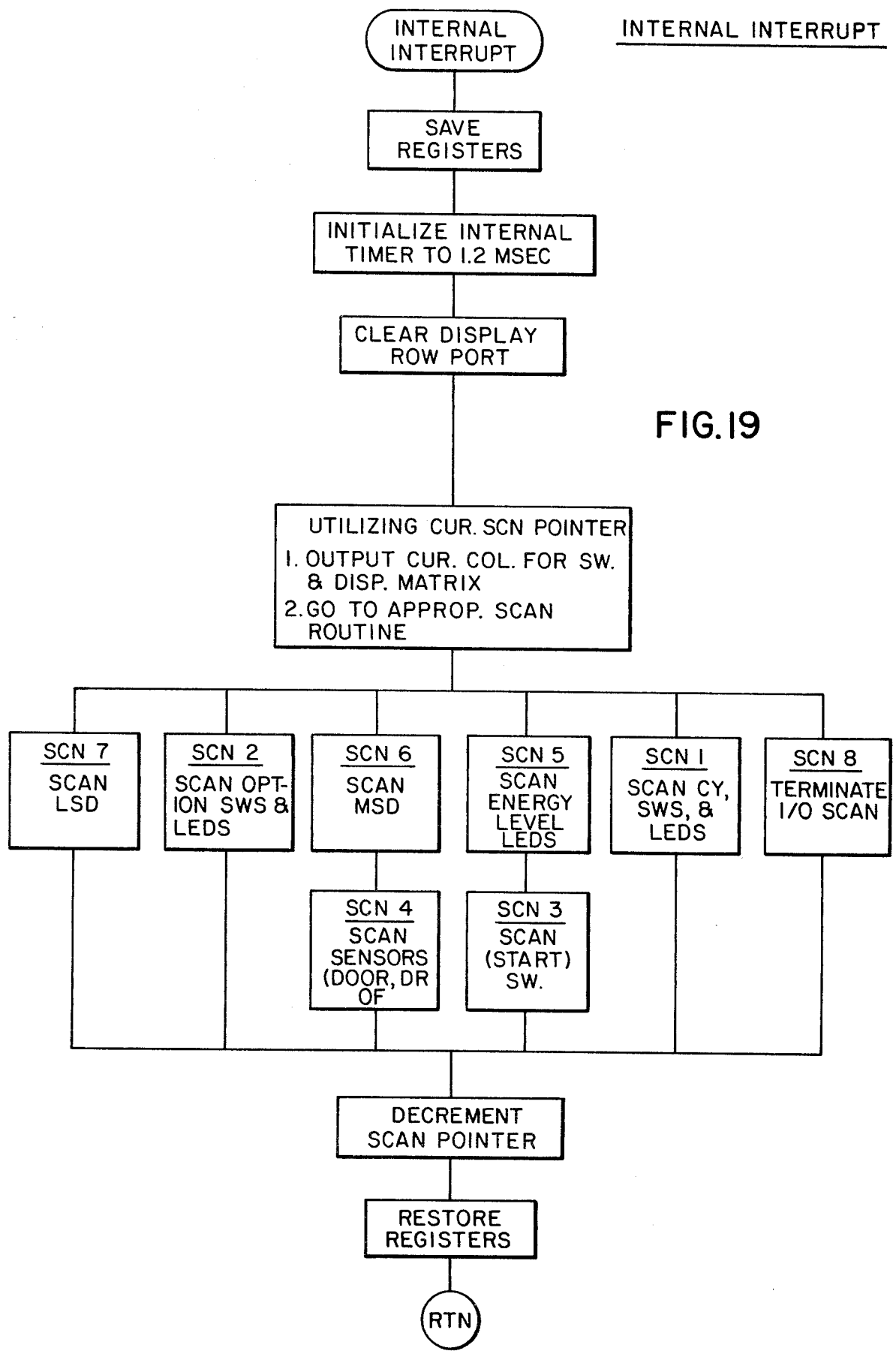
Figure 20:
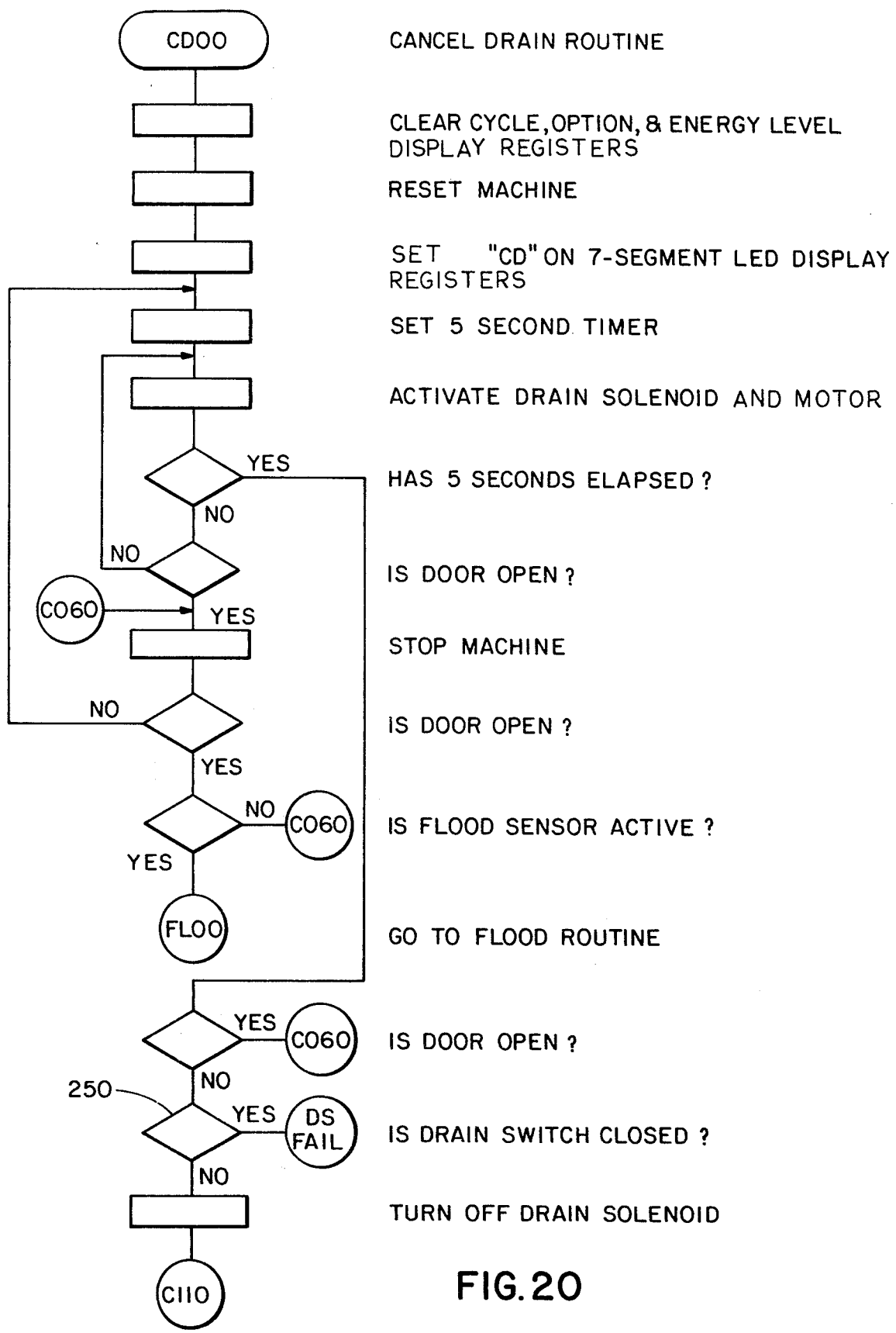
Figure 20A:
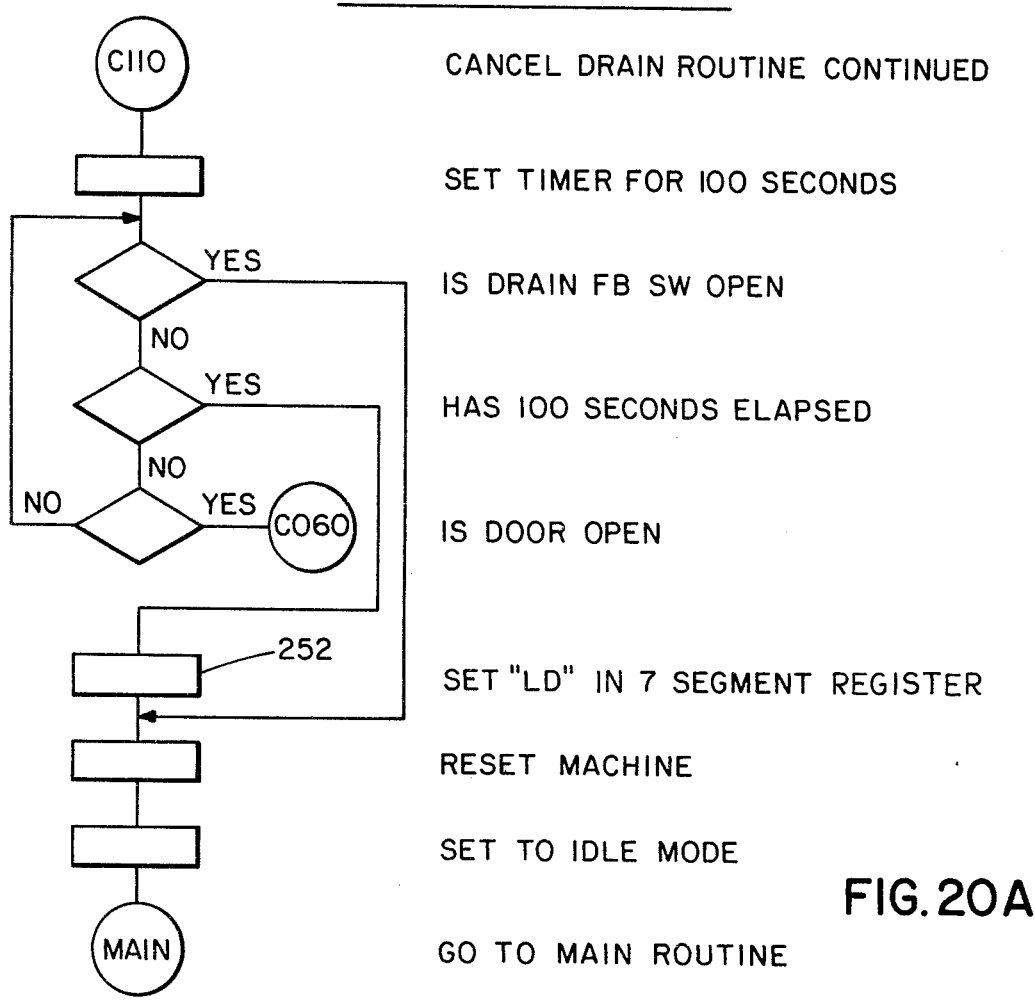

Referring to FIG. 18, the external interrupt routine is illustrated. It will be recalled that this interrupt routine is invoked whenever the processor detects a valid interrupt request. The request is generated by a high signal applied to the external interrupt pin of the microprocessor. This occurs at each zero crossing of the line frequency (every 8.33 milliseconds). The program enables internal interrupts while disabling further external interrupts. The current status of the relay drivers is also output by this routine.

INTERNAL INTERRUPT

The internal interrupt (FIG. 19) is generated six times during the 8.33 milliseconds time period following an external interrupt. These internal interrupts are spaced approximately 1.2 milliseconds apart. After saving data, control is transferred to SCN sub-routines 1 through 8, which performs all of the I/O for updating the panel display and inputting selections from membrane switches which may have been pushed.

Referring specifically to the SCN sub-routines, they are used to alternate between entry and display. The SCN pointer located in a microprocessor register indexes through each of the eight SCN routines. SCN1 updates and maintains the display LEDs and inputs selections from the cycle membrane switches. SCN2 maintains the option display lines and inputs option selections from the option switches. These include the water level and type of drying. SCN3 recognizes a start request. SCN4 determines the present status of the door, flood and drain switches. SCN5 maintains the energy level indicator display 102 on the front panel. SCN6 and SCN7 maintain the two digit seven segment displays on the front panel which display either a fault code or the time to cycle completion as previously described. SCN8 disables further internal interrupts and re-enables external interrupts. Upon execution of SCN8, the internal interrupts conclude and a return to the base level program is effected.

CANCEL-DRAIN ROUTINE

The cancel-drain routine (FIGS. 20 and 20A) interrupts normal machine action. During the subsequent power up routine the existence of a cancel-drain request is detected as previously described and a drain cycle is initiated removing all water from the appliance and returning the program to the main routine 200. Included in the cancel-drain routine is drain failure detection similar to that described for the drain routine of FIG. 17. Thus, at point 250 a drain system failure is flagged if the drain switch is not properly positioned while at point 252 a long drain is flagged if excessive time is required to complete the drain function. The cancel-drain routine also includes branching to the door monitor routine 206 and to the flood routine 207 is appropriate.

CYCLE INTERRUPTION CONTROL (INCK)

This routine (FIG. 21) is called periodically to perform a set of standard interrupt checks. Checks are made for a flood condition or an open door. If either of these conditions exist, control is transferred to the appropriate routine otherwise a return to the appropriate routine is effected.

DOOR MONITOR ROUTINE

The door monitor routine (FIG. 21A) is used to suspend operation of the appliance and disable the cycle timer whenever the door is open. During this time a periodic check is made for the existance of a flood condition and, if detected, branching to the flood routine is effected. When the appliance door is closed, INCK returns program control to the appropriate portion of the base level program.

FLOOD ROUTINE

Figure 21:
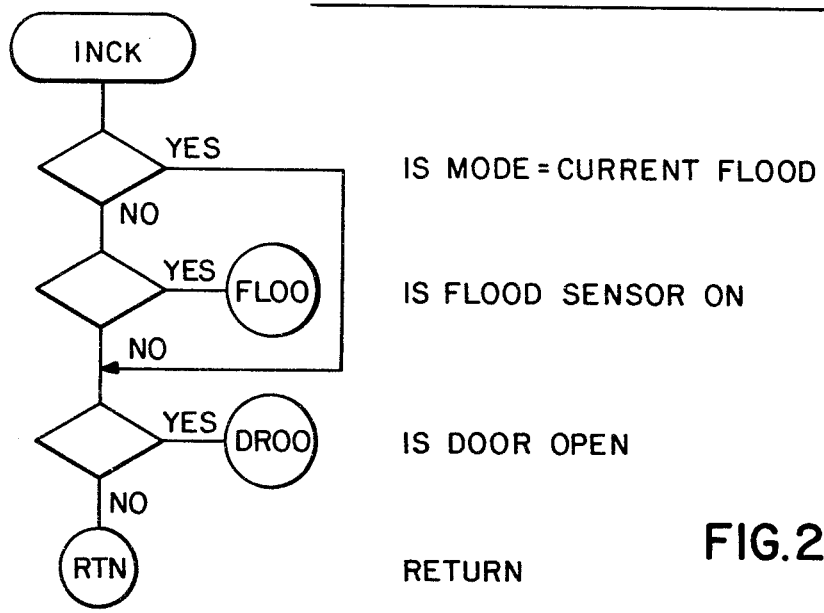
Figure 21A:
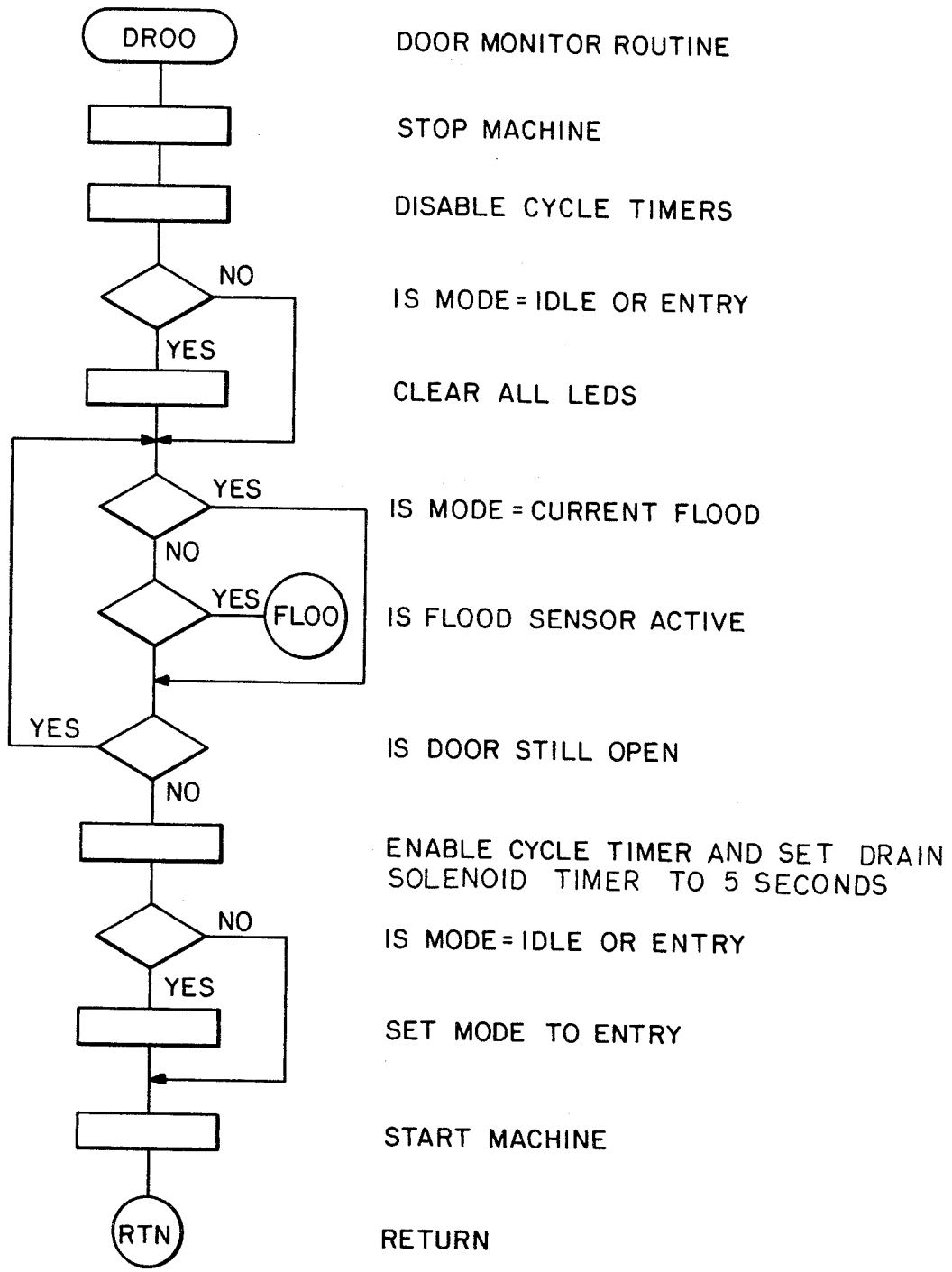

Referring to FIG. 21B, the flood protection routine is illustrated. This routine functions to pump out water in the machine whenever an overfill condition is recognized by the flood switch. The flood routine will be performed to the exclusion of any other function when an overfill is detected through INCK (FIG. 21) or the door monitor routine (FIG. 21A). The routine is closed looped and, onece a flood condition is detected, program control cannot return to normal operation without user interaction in the form of operating the cancel-drain switch. The flood routine can be activated during machine operation or when the machine is off since the microprocessor remains on regardless of the state of the appliance. When the flood routine is entered it initiates a drain operation and maintains the draining operation until the flood switch has been reset to its normal position for a preselected time period. The flood routine displays FL on the two digit control panel display to signal this condition.

DIAGNOSTIC CYCLE

A comprehensive set of tests can be performed by utilizing the built-in diagnostic cycle. This cycle is selected by simultaneously closing switches S13 and S14 (FIG. 4). The membrane touch switches S13 and S14 shown in phantom in FIG. 2 are hidden since they are included primarily for use by the service technician. This cycle performs each of the basic machine functions at least once for a period of time representing their usage in a normal cycle. To minimize the amount of ROM space required to store and perform the diagnostic cycle, the existing program for the machine's normal operation is used to the fullest extent possible. To this end, the diagnostic cycle is performed like any other cycle. Its execution is handled by the execution driver X100 (FIG. 16) and defined by a set of entries in the execution look-up table. To avoid adding a large number of sensors for testing purposes, advantage is taken of the service technician's senses. The test cycle will display a function code on the front panel seven segment display describing what should be happening at any particular point in the test cycle. It is left to the technician to ascertain if, in fact, those functions are being performed.

The diagnostic cycle will sequence through the usual cycles as follows:

| Action | Time (in seconds) | Seven Segment Display |
|---|---|---|
| Test lights | 5 | all segments lit |
| Pre-cycle drain | 70 | Po |
| Fill | 70 | Fil |
| Circulate | 295 | C |
| Detergent trip | 10 | dE |
| Circulate/heat | 780 | CH |
| Rinse-aid dispense | 10 | rA |
| Drain | 10 | Po |
| Dry (if selected) | 1275 | dr |

Execution begins by pushing the START button. While in the diagnostic cycle, any function except light test or pump out may be cancelled by depressing the START button. Execution will then advance to the next function in the sequence. All error messages (FL, DS, PD, and LD) are available during the test cycle. The test cycle may be aborted by depressing the CANCEL button on the control panel.

While I have shown and described embodiments of this invention in some detail, it will be understood that this description and illustrations are offered merely by way of example, and that the invention is to be limited in scope only by the appended claims.

What is claimed is:

1. A control circuit for permitting a user to selectively operate a washing appliance having electromechanical means for filling, circulating, and draining water in said appliance, said circuit comprising:
   (a) a microprocessor including a read only memory having a supervisory program stored therein,
   (b) input means permitting user selection of desired operation cycles and including means for communication with said microprocessor to permit the latter to determine the cycle selected by the user, said microprocessor controlling said electromechanical means responsive to said user selected cycles,
   (c) display means for providing the user with information regarding the operating state of the appliance,
   (d) means for interconnecting said display means to said microprocessor, said microprocessor periodically updating said display means during operation of said appliance,
   (e) diagnostic means for verifying correct operation of said appliance, operative to sequentially actuate said electromechanical means to initiate the operating cycles provided by each of said electromechanical means,
   (f) means for initiating operation of said diagnostic means in response to operator input, and
   (g) means for selectively canceling operation of desired ones of said electromechanical means.

2. The control circuit according to claim 1 wherein said display means further includes a control panel having at least one alpha-numeric display element, said microprocessor producing an alpha-numeric character on said element during operation of said diagnostic means indicative of the portion of the appliance cycle being tested.

3. The control circuit according to claim 1 wherein said input means includes a plurality of input switches connected in a row and column matrix, operation of each switch in said matrix communicating a unique digital code to said microprocessor corresponding to a different cycle option, said code being utilized by said supervisory program to determine the operating cycle to be employed.

4. The control circuit according to claim 1 wherein said display means includes a control panel having visual indicators to indicate:
   (i) the cycle option selected,
   (ii) the current portion of a selected cycle being executed by the appliance.

5. The control circuit according to claim 1 wherein said control means includes detecting means for identifying and communicating an appliance malfunction to the microprocessor.

6. The control circuit according to claim 5 wherein said display means includes a control panel having an alpha-numeric display element which displays:
   (i) the time to the end of the user selected cycle during normal cycle operation, and
   (ii) microprocessor generated fault codes indicative of an appliance malfunction.

7. The control circuit according to claim 1 wherein said control circuit includes manually operable means for terminating operation of said diagnostic means at any time in the diagnostic cycle.

8. The control circuit according to claim 6 wherein said detecting means cooperate with said diagnostic means to display said microprocessor generated fault codes upon detection of an appliance malfunction during operation of said diagnostic means.

* * * * *